United States Patent
Tanaka

(10) Patent No.: US 7,904,915 B2
(45) Date of Patent: Mar. 8, 2011

(54) INFORMATION PROCESSING DEVICE, INFORMATION PROCESSING METHOD, INFORMATION PROCESSING PROGRAM, AND RECORDING MEDIUM

(75) Inventor: Hiroyuki Tanaka, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1029 days.

(21) Appl. No.: 11/502,516

(22) Filed: Aug. 11, 2006

(65) Prior Publication Data

US 2007/0061775 A1    Mar. 15, 2007

(30) Foreign Application Priority Data

Aug. 15, 2005 (JP) ................. 2005-235422
Aug. 1, 2006 (JP) ................. 2006-210268

(51) Int. Cl.
  *G06F 3/00* (2006.01)
  *G06F 9/44* (2006.01)
(52) U.S. Cl. ........................ 719/328; 717/120
(58) Field of Classification Search .......... None
  See application file for complete search history.

(56) References Cited

U.S. PATENT DOCUMENTS

| | | | |
|---|---|---|---|
| 5,652,714 A * | 7/1997 | Peterson et al. | 702/57 |
| 6,434,343 B1 * | 8/2002 | Kobayashi et al. | 399/8 |
| 2003/0072023 A1 | 4/2003 | Tanaka | |
| 2003/0133136 A1 | 7/2003 | Ohishi et al. | |
| 2003/0140174 A1 | 7/2003 | Ohishi et al. | |
| 2003/0218765 A1 | 11/2003 | Ohishi et al. | |
| 2004/0057067 A1 | 3/2004 | Ohishi et al. | |
| 2004/0075857 A1 | 4/2004 | Akiyoshi et al. | |
| 2004/0109188 A1 | 6/2004 | Akiyoshi et al. | |
| 2004/0239973 A1 | 12/2004 | Tanaka et al. | |
| 2004/0246512 A1 * | 12/2004 | Miyamoto | 358/1.14 |
| 2005/0018236 A1 * | 1/2005 | Shirai et al. | 358/1.14 |
| 2005/0057771 A1 | 3/2005 | Ohishi et al. | |

FOREIGN PATENT DOCUMENTS

JP    2002-84383    3/2002

* cited by examiner

*Primary Examiner* — Hyung S Sough
*Assistant Examiner* — Carina Yun
(74) *Attorney, Agent, or Firm* — Oblon, Spivak, McClelland, Maier & Neustadt, L.L.P.

(57) ABSTRACT

In an information processing device adapted for performing an application program, a displaying unit causes a display device to display information related to a state transition of the application program. A generation unit receives an input updating request for updating information related to a displayed state transition, and generates an application program which realizes a state transition according to the updating request.

17 Claims, 23 Drawing Sheets

INFORMATION PROCESSING DEVICE, INFORMATION PROCESSING METHOD, INFORMATION PROCESSING PROGRAM, AND RECORDING MEDIUM

BACKGROUND OF THE INVENTION

1. Field of the Invention

The present invention relates to an information processing device which is inclusive of a computer device, such as a personal computer or server computer, and an image forming device, such as a copier, printer, scanner, facsimile, composite machine or multi-function peripheral. Moreover, the present invention relates to an information processing method, an information processing program, and a recording medium, such as an SD memory card.

2. Description of the Related Art

In recent years, a composite machine or multi-function peripheral which is provided with a copier function, a printer function, a scanner function and a facsimile function has come to be marketed. The composite machine or multi-function peripheral is configured to print an image on a copy sheet when it functions as a copier or a printer. The composite machine or multi-function peripheral is configured to read an image from an original document when it functions as a copier or a scanner. The composite machine or multi-function peripheral is configured to transmit an image to or receive an image from an external device through a communication line when it functions as a facsimile. For example, see Japanese Laid-Open Patent Application No. 2002-084383.

In recent years, various application programs are often implemented in the composite machine or the multi-function peripheral. However, it is not unusual that a user of the composite machine or the multi-function peripheral does not notice existence of a special useful application program implemented therein.

In such a case, existence of the special useful application program will become useless, and an unnecessary burden will be continuously put on the user of the composite machine or the multi-function peripheral. Such situations are the same also with respect to information processing devices other than image forming devices, such as composite machines or multi-function peripherals.

SUMMARY OF THE INVENTION

According to one aspect of the invention, there is provided an improved information processing device and method in which the above-described problems are eliminated.

According to one aspect of the invention there is provided an information processing device which provides a user of the information processing device with a useful application program in the information processing device in which various applications are implemented.

In an embodiment of the invention which solves or reduces one or more of the above-mentioned problems, there is provided an information processing device adapted for performing an application program, the information processing device comprising: a displaying unit causing a display device to display information related to a state transition of the application program; and a generation unit receiving an input updating request for updating information related to a displayed state transition, and generating an application program which realizes a state transition according to the updating request.

In an embodiment of the invention which solves or reduces one or more of the above-mentioned problems, there is provided any of an information processing method, a computer-readable program, and a computer-readable recording medium which are adapted for providing a user of the above-mentioned information processing device with a useful application program in the information processing device in which various applications are implemented.

According to embodiments of the information processing device and method of the invention, it is possible to provide the technique of providing the user of the information processing device with a useful application program for use in the information processing device in which various application programs are implemented.

BRIEF DESCRIPTION OF THE DRAWINGS

Other objects, features and advantages of the present invention will be apparent from the following detailed description when reading in conjunction with the accompanying drawings.

DETAILED DESCRIPTION OF PREFERRED EMBODIMENTS

A description will be given of embodiments of the invention with reference to the accompanying drawings.

Figure 1:
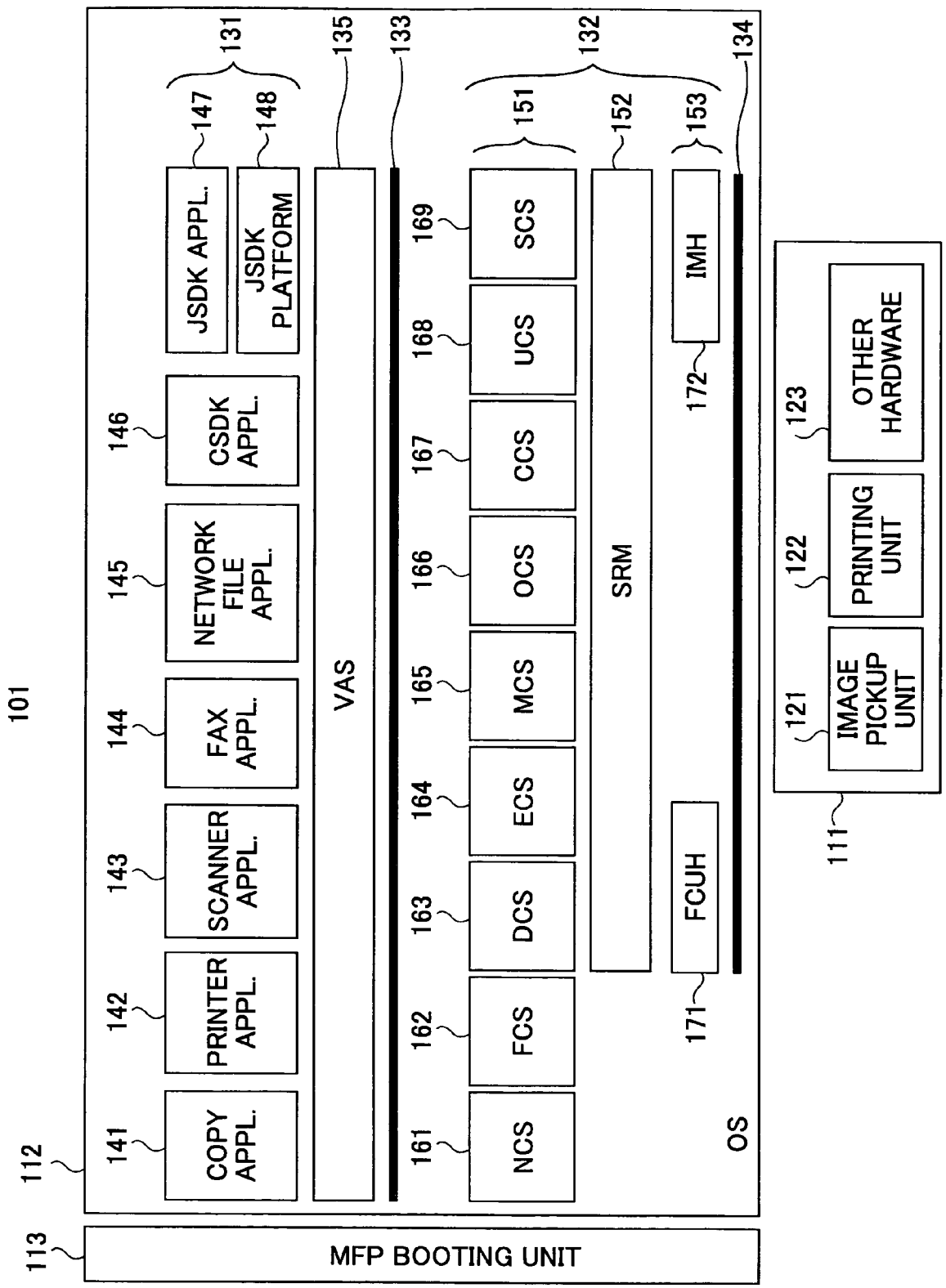
FIG. 1 is a diagram showing the composition of a multi-function peripheral in an embodiment of the invention.

FIG. 1 shows the composition of the multi-function peripheral (MFP) 101 in an embodiment of the invention.

The MFP 101 of FIG. 1 comprises various hardware elements 111, various software elements 112, and a MFP booting unit 113. The hardware elements 111 of the multi-function peripheral 101 include an image pick-up unit 121, a printing unit 122, and other hardware elements 123.

The image pick-up unit 121 is the hardware for reading an image (image data) from the original document. The printing unit 122 is the hardware for printing an image (image data) on a copy sheet.

The software elements 112 of the multi-function peripheral 101 include various application programs 131 and various platform programs 132. The OS (operating system), such as UNIX (registered trademark), carries out parallel execution of the respective programs of the software elements 112 as the processes.

The application programs 131 include a copy application 141 which is the application program for a copier, a printer application 142 which is the application program for a printer, a scanner application 143 which is the application program for a scanner, a facsimile application 144 which is the application program for a facsimile, a network file application 145 which is the application program for network files.

Another one of the application programs 131 can be developed using a dedicated SDK (software-development kit). Such application program 131 which is developed using the SDK will be called SDK application. The dedicated SDK may include a CSDK for developing the application program 131 in the C language, and a SDK for developing the application program 131 in the Java (registered trademark) language. The application program 131 developed using the CSDK will be called "CSDK application", and the application program 131 developed using the JSDK is called "JSDK application".

The multi-function peripheral 101 of FIG. 1 includes also the CSDK application 146 and the JSDK application 147. Moreover, the JSDK platform 148 is further provided in the multi-function peripheral 101 of FIG. 1 as the software element 112 which performs the intermediary tasks between the JSDK application 147 described in the Java language and another software element 112 described in the C language.

The platform 132 includes various control services 151, a system resource manager 152, and various handlers 153. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

The process of NCS 161 performs intermediary tasks for network communications. The process of FCS 162 provides the API (application program interface) of facsimile. The process of DCS 163 performs control related to the message distribution processing of stored documents. The process of ECS 164 performs control related to the image pick-up unit 121 and the printing unit 122. The process of MCS 165 performs control related to the memory and the hard disk drive. The process of OCS 166 performs control related to the operation panel. The process of CCS 167 performs control related to authenticating processing and charging processing. The process of UCS 168 performs control related to the management of user information. The process of SCS 169 performs control related to the management of the system.

A virtual application service (VAS) 135 is provided as the software element 112 which performs the intermediary tasks between the application program 131 and the platform 132. The VAS 135 operates as a server process which makes the application program 131 a client, while it operates as a client process which makes the platform 132 a server. The VAS 135 is provided with the wrapping function which serves to conceal the platform 132 from the application program 131, and it plays the role which absorbs the version difference accompanied with the upgrading of the platform 132.

The MFP booting unit 113 is first initiated upon the power up of the multi-function peripheral 101. Thereby, the OS, such as UNIX (registered trademark), is started and the application programs 131 and the platform 132 are started. These programs are stored in the hard disk drive or the memory card, and they are read from the hard disk drive or the memory card and loaded to the computer memory.

Figure 2:
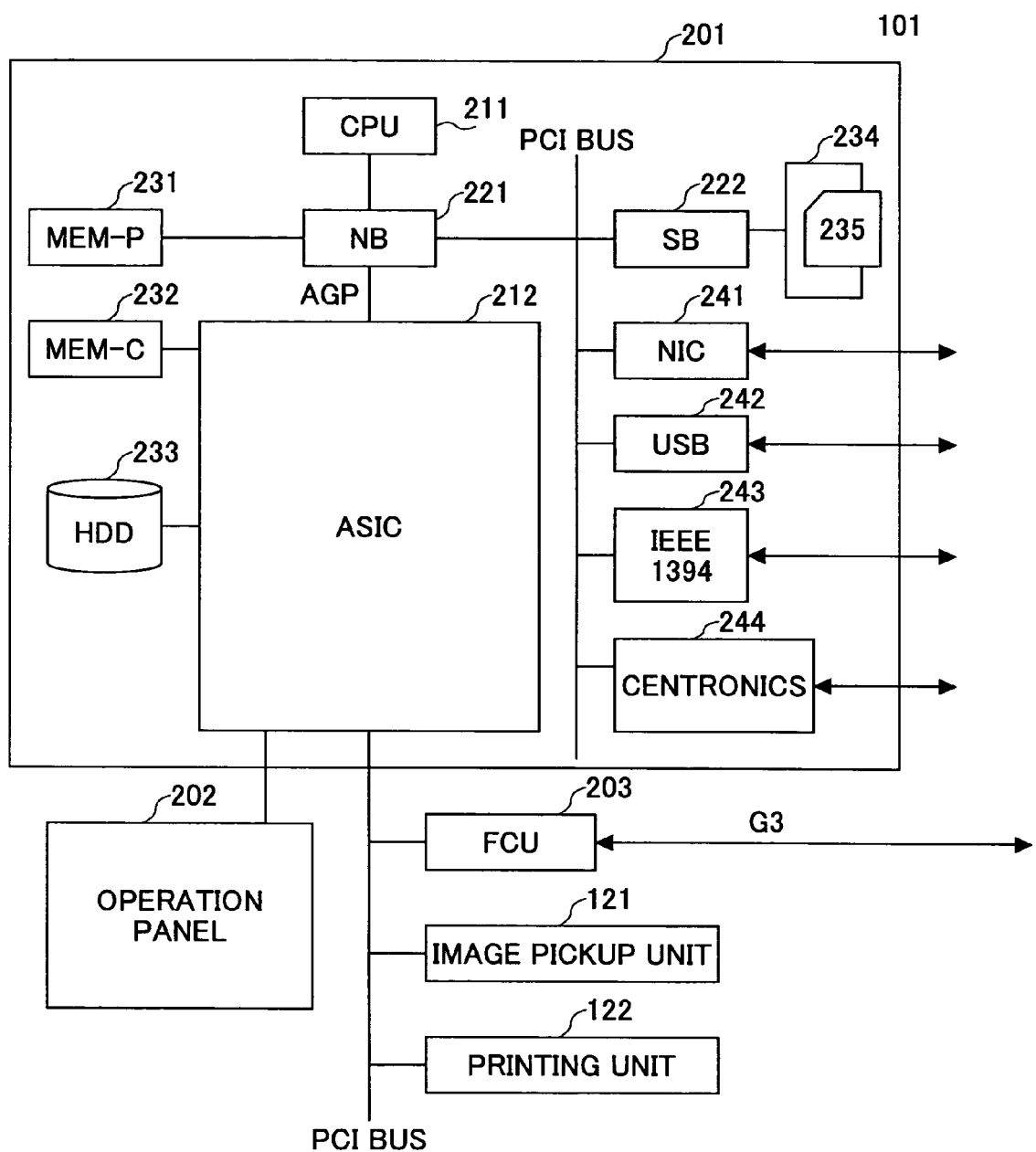
FIG. 2 is a diagram showing the hardware composition of the multi-function peripheral of FIG. 1.

FIG. 2 is a diagram showing the hardware composition of the multi-function peripheral 101 of FIG. 1. The hardware elements 111 of the multi-function peripheral 101 include a controller 201, an operation panel 202, a facsimile control unit (FCU) 203, the image pick-up unit 121, and the printing unit 122.

The controller 201 comprises a CPU 211, an ASIC 212, a NB 221, a SB 222, a MEM-P 231, a MEM-C 232, a HDD (hard disk drive) 233, a memory card slot 234, a NIC (network interface controller) 241, a USB device 242, an IEEE1394 device 243, and a Centronics device 244.

The CPU 211 is the IC for various information processing. The ASIC 212 is the IC for various image processing. The NB 221 is the north bridge of the controller 201. The SB 222 is the south bridge of the controller 201. The MEM-P 231 is the system memory of the multi-function peripheral 101. The MEM-C 232 is the local memory of the multi-function peripheral 101. The HDD 233 is the storage device of the multi-function peripheral 101. The memory card slot 234 is a slot for setting a memory card 235. The NIC 241 is a controller for network communications by using a MAC address. The USB device 242 is a device for providing the connection interface in conformity with the USB specifications. The IEEE1394 device 243 is a device for providing the connection interface in conformity with the IEEE1394 specifications. The Centronics device 244 is a device for providing the connection interface in conformity with the Centronics specifications.

The operation panel 202 is the hardware (operation device) for an operator to give an input to the multi-function peripheral 101, while it is the hardware (display device) for an operator to obtain an output from the multi-function peripheral 101.

Figure 3:
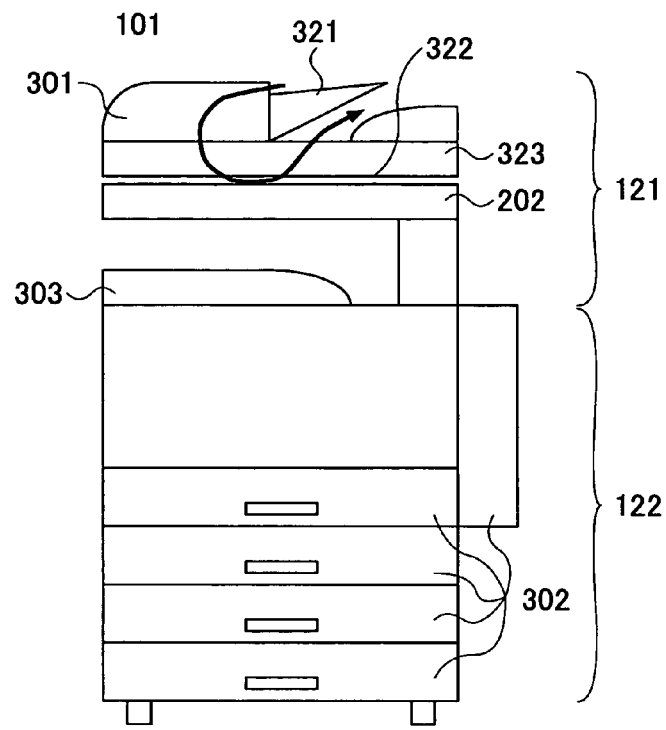
FIG. 3 is a diagram showing the external appearance of the multi-function peripheral of FIG. 1.

FIG. 3 is a diagram showing the external appearance of the multi-function peripheral 101 of FIG. 1.

In FIG. 3, the position of the image pick-up unit 121, the position of the printing unit 122, and the position of the operation panel 202 are illustrated. Illustrated further in FIG. 3 are a document set part 301 used as the place of an original document being set, a sheet feeding part 302 used as the place of a copy sheet being fed, and a sheet ejection part 303 used as the place of a copy sheet being ejected.

Figure 4:
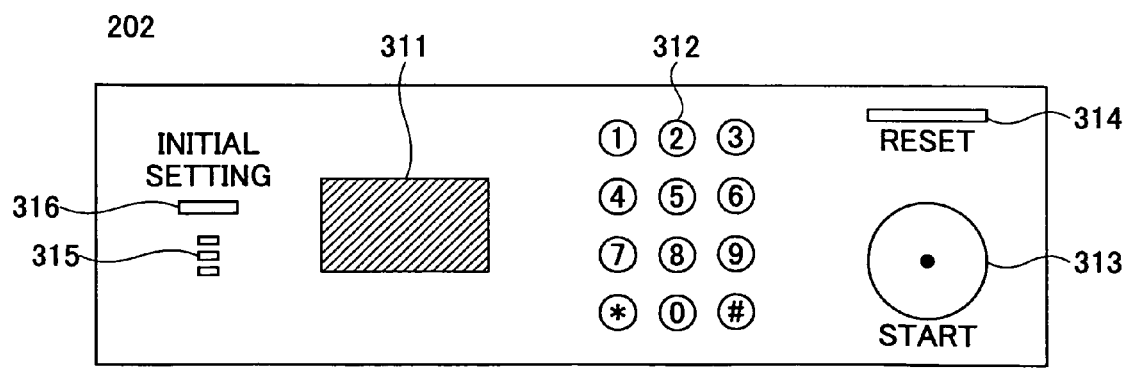
FIG. 4 is a diagram showing the composition of an operation panel in the multi-function peripheral of FIG. 1.

The operation panel 202 comprises a touch panel 311, ten keys 312, a start button 313, a reset button 314, function keys 315, and an initial-setting button 316 as shown in FIG. 4. The touch panel 311 is the hardware (touch operation unit) for giving an input to the MFP by touch operation, while it is the hardware (display device) for obtaining an output from the MFP in the form of a display screen. The ten keys 312 are the hardware for giving a numeric input by key (button) operation. The start button 313 is the hardware for performing start operation by depression of the button. The reset button 314 is the hardware for performing reset operation by depression of the button. The function keys 315 are the hardware for displaying an operational screen by CSDK application 146 or JSDK application 147 by depression of the key (button). The initial-setting button 316 is the hardware for displaying an initial-setting screen by depression of the button.

The document set part 301 contains an ADF (automatic document feeder) 321, a flat bed 322, and a flat bed cover 323. The sheet feeding part 302 contains four sheet trays. The sheet ejection part 303 contains a sheet ejection tray.

Figure 5:
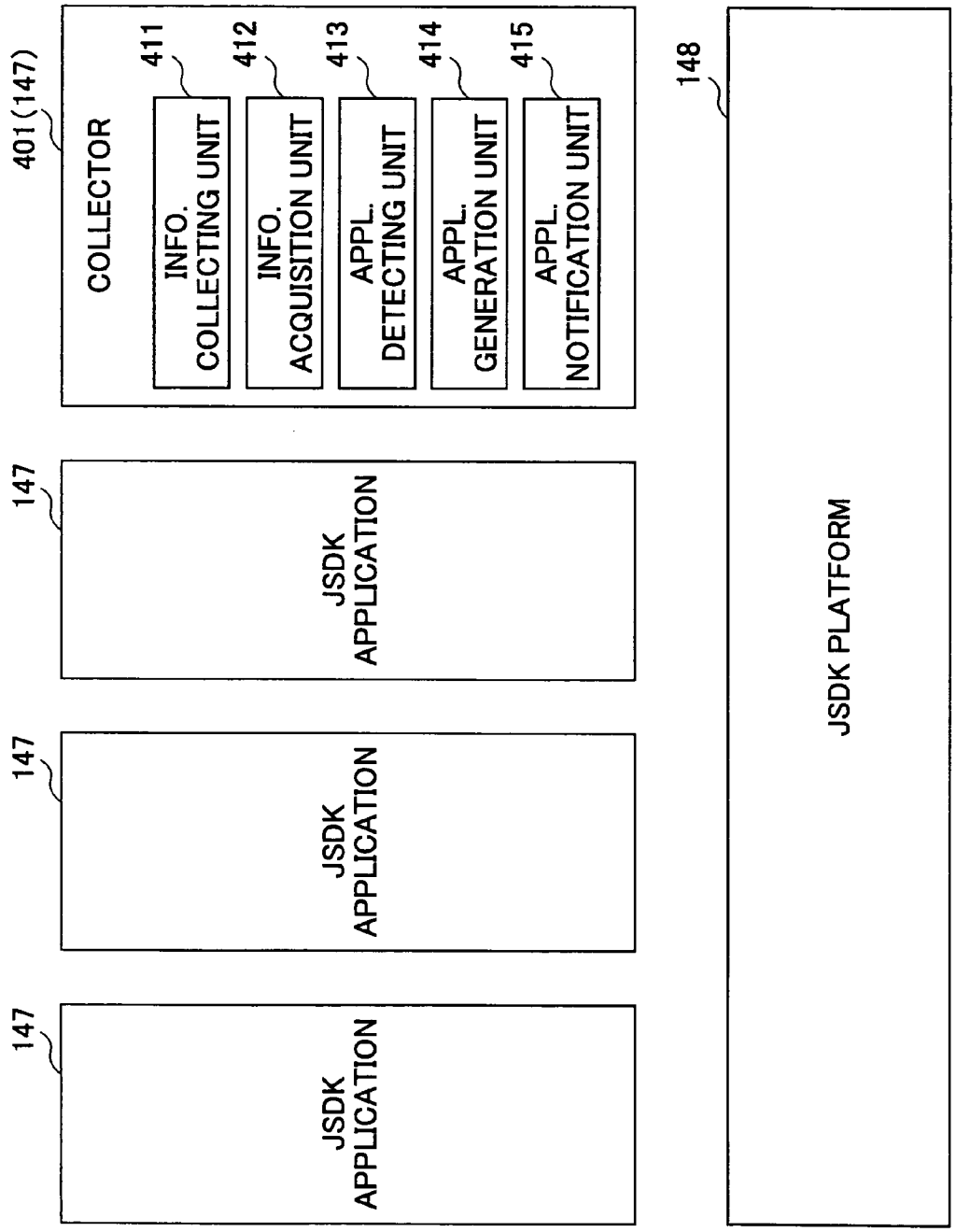
FIG. 5 is a functional block diagram for explaining operation of a collector.

FIG. 5 is a functional block diagram for explaining operation of a collector 401. The collector 401 is one of a plurality of JSDK applications 147 implemented in the multi-function peripheral 101 of FIG. 1. The collector 401 collects various kinds of information related to the operating condition of the multi-function peripheral 101 of FIG. 1, and performs various information processing related to JSDK application 147 of the multi-function peripheral 101 of FIG. 1.

As shown in FIG. 5, the collector 401 comprises an information collecting unit 411, an information acquisition unit 412, an application detecting unit 413, an application generation unit 414, and an application notification unit 415. The information collecting unit 411 is a functional block which collects automatically information related to an operating condition of the multi-function peripheral 101. The information acquisition unit 412 is a functional block which acquires automatically information related to a state transition of the multi-function peripheral 101. The application detecting unit 413 is a functional block which detects automatically a recommended JSDK application 147 for use in the multi-function peripheral 101. The application generation unit 414 is a functional block which generates automatically a recommended JSDK application 147 for use in the multi-function peripheral 101. The application notification unit 415 is a functional block which notifies automatically a user of existence of the recommended JSDK application 147 for use in the multi-function peripheral 101.

Figure 6:
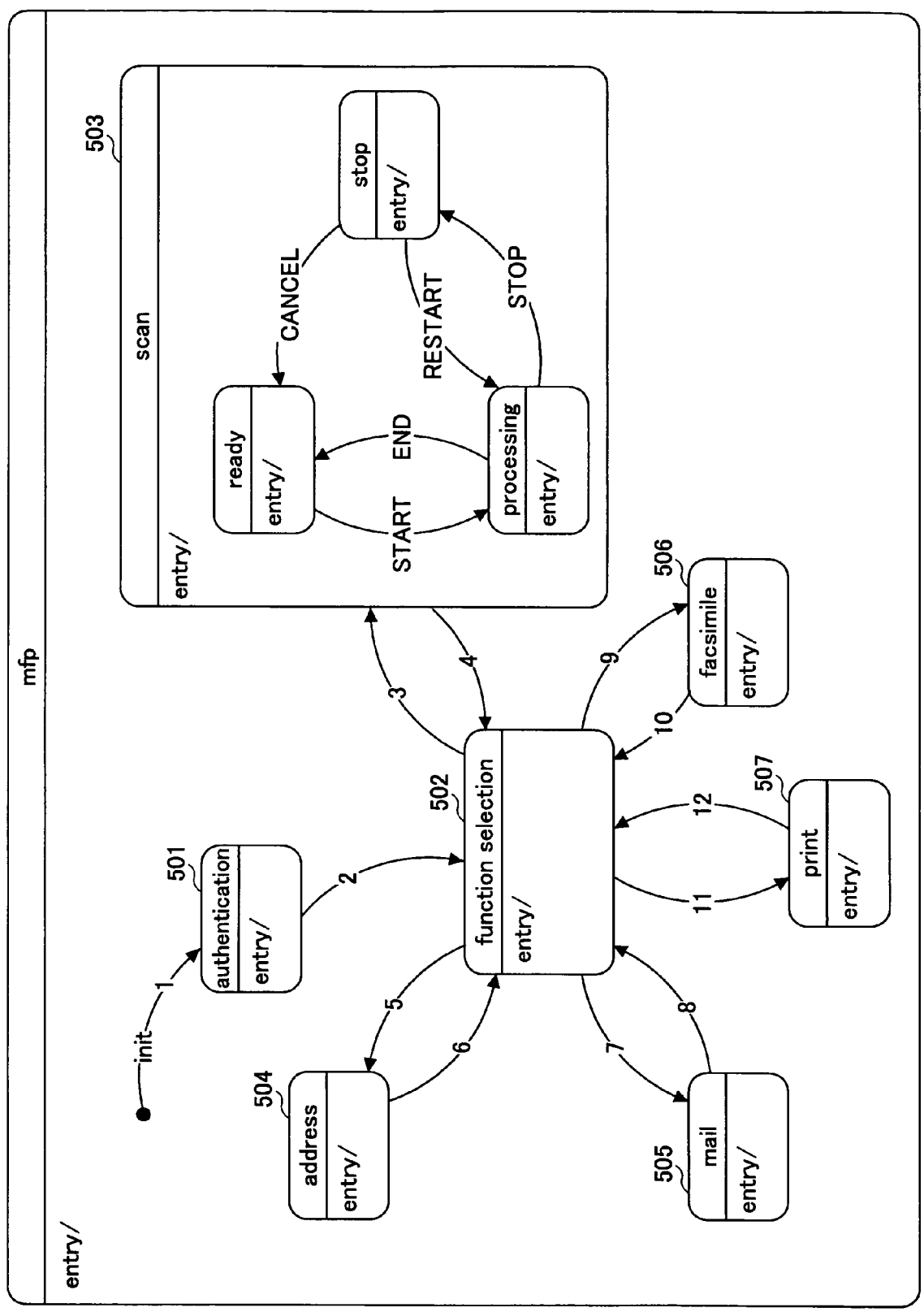
FIG. 6 is a state transition diagram for explaining a state transition of the multi-function peripheral of FIG. 1.
Figure 7:
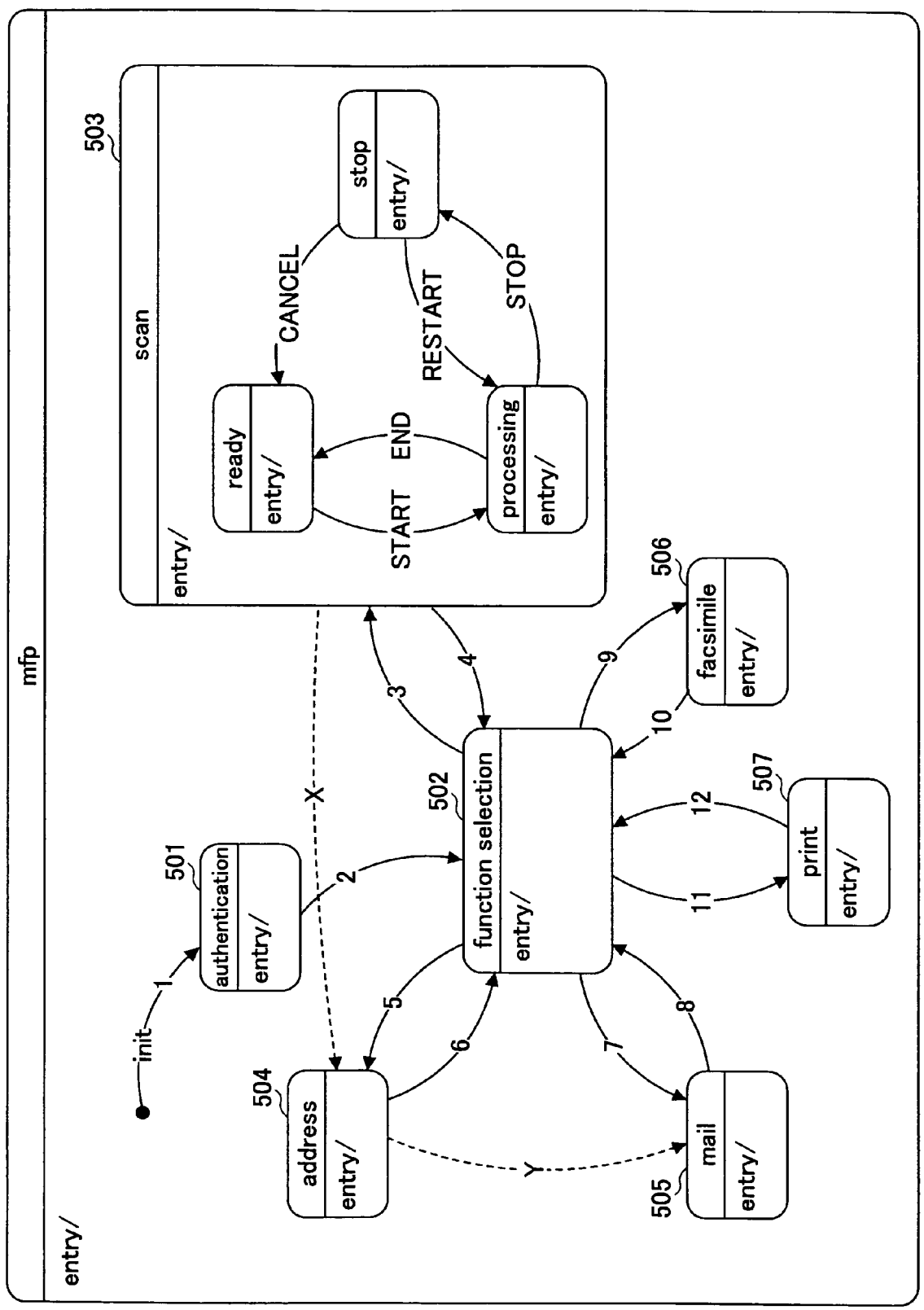
FIG. 7 is a state transition diagram for explaining a state transition of the multi-function peripheral of FIG. 1.
Figure 8:
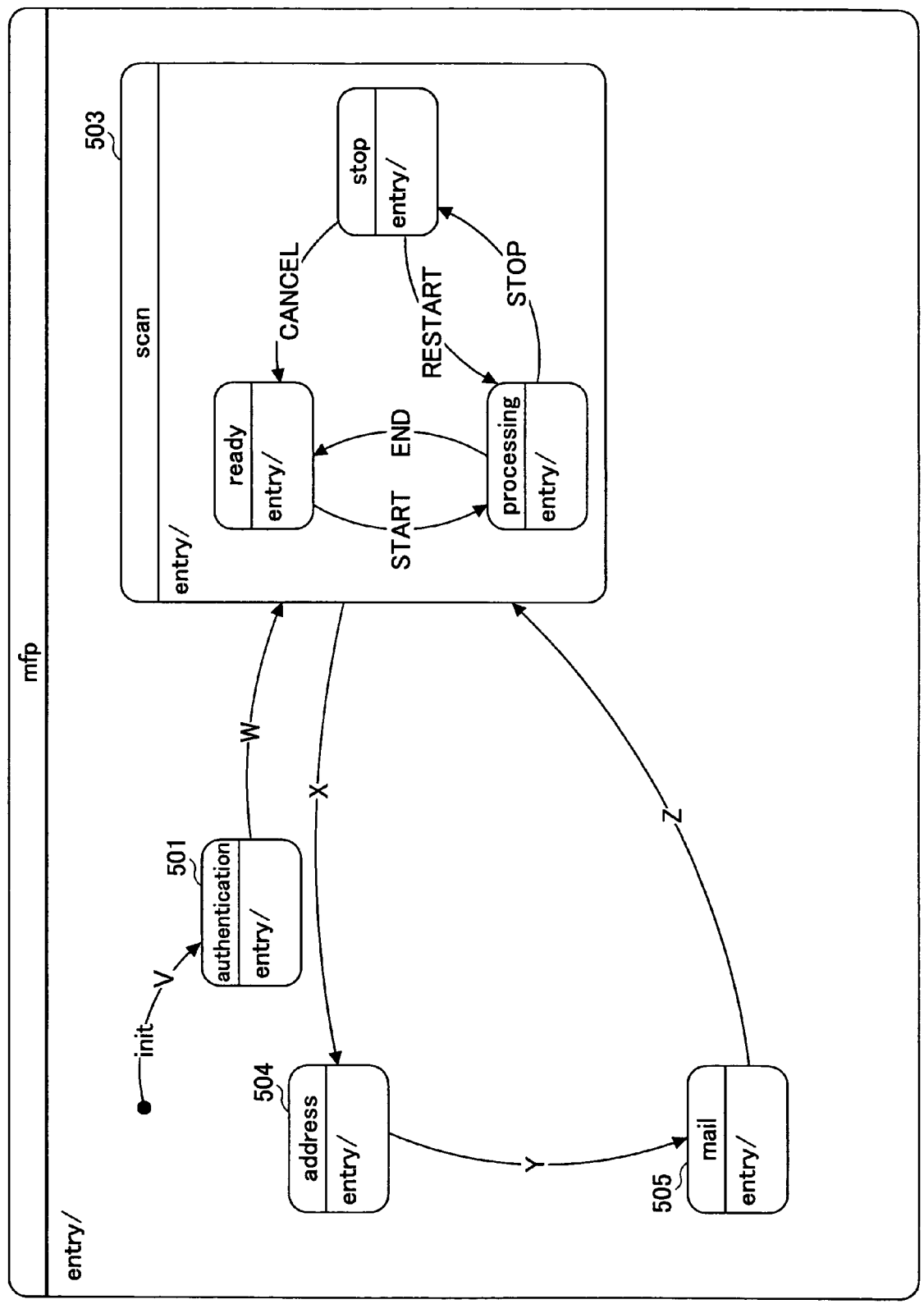
FIG. 8 is a state transition diagram for explaining a state transition of the multi-function peripheral of FIG. 1.

FIG. 6, FIG. 7 and FIG. 8 are state transition diagrams for explaining state transitions of the multi-function peripheral 101 of FIG. 1, respectively.

The state transition diagram of FIG. 6 illustrates the case in which a user specifies the destination address and transmits the scanning result by e-mail.

First, if the user turns ON the power supply of the multi-function peripheral 101, the multi-function peripheral 101 shifts to the authentication state 501 (S1). Next, if the user gives a login to the multi-function peripheral 101, the multi-function peripheral 101 shifts to the function selection state 502 (S2).

Next, if the user chooses the scanning function, the multi-function peripheral 101 shifts to the scan state 503 (S3). Next, if the user completes the scan operation, the multi-function peripheral 101 returns to the function selection state 502 (S4). Next, if the user chooses the address function, the multi-function peripheral 101 shifts to the address state 504 (S5). Next, if the user completes the address operation, the multi-function peripheral 101 returns to the function selection state 502 (S6). Next, if the user chooses the electronic mail function, the multi-function peripheral 101 shifts to the e-mail state 505 (S7). Next, if the user completes the e-mail transmission operation, the multi-function peripheral 101 returns to the function selection state 502 (S8).

In the collector 401, the information collecting unit 411 collects information related to an operating condition of the multi-function peripheral 101. This information is, for example, log information indicating which user uses the multi-function peripheral 101, what function thereof, by what setting, and at what date and time, etc.

In the collector 401, the information acquisition unit 412 acquires information related to a state transition of the multi-function peripheral 101, by using the information collected by the information collecting unit 411. This information is, for example, history information indicating how the state of the multi-function peripheral 101 has changed from S1 to S8. By obtaining the history information, the collector 401 is able to recognize the processes of the state transitions of the multi-function peripheral 101.

When the operating condition of the multi-function peripheral 101 of FIG. 1 is frequently set in the case in which the user specifies the destination address and transmits the scanning result by e-mail, the frequency of occurrence of the state transitions "S3-S4-S5-S6-S7-S8" of FIG. 6 is high with respect to the state transition of the multi-function peripheral 101 of FIG. 1. Therefore, as shown in the state transition of FIG. 7, if a state transition (SX) from the scan state 503 to the address state 504 and a state transition (SY) from the address state 504 to the e-mail state 505 can be performed, such is very convenient for the user. These are equivalent to a transition of the operation display screen from the scanning display screen directly to the address setting display screen after the completion of the scan operation, and a transition of the operation display screen from the address setting display screen directly to the e-mail transmission display screen after the completion of the address setting operation.

Suppose that the multi-function peripheral 101 of FIG. 1 is provided with a JSDK application 147 which realizes the state transitions "SV-SW-SX-SY-SZ" of FIG. 8. This JSDK application 147 is a useful JSDK application 147 that realizes the state transitions of FIG. 7, considering the above-mentioned viewpoint. Existence of such JSDK application 147 can be detected by using the information related to the state transition of the multi-function peripheral 101 of FIG. 1.

For this purpose, in the collector 401, the application detecting unit 413 uses the information acquired by the information acquisition unit 412 (which information corresponds to the information collected by the information collecting unit 411), and detects existence of such JSDK application 147 as being the recommended JSDK application 147 for use in the multi-function peripheral 101. The details of this detecting method will be described later.

Moreover, in the collector 401, the application notification unit 415 notifies a user of existence of the JSDK application 147 detected by the application detecting unit 413, as the recommended JSDK application 147 for use in the multi-function peripheral 101. The details of this notifying method will be described later.

For example, a case in which a scanning result is transmitted by e-mail and the same is transmitted by facsimile is considered. In the address state 504, after the state transitions of S1-S5 of FIG. 6 are performed, the user inputs a mail address together a FAX number as the address setting operation. Alternatively, the address setting operation may be selection of a user name of a user as the destination, instead of the direct input of the mail address and the FAX number. In this case, what is necessary is just to set up a transmission destination appropriate for every individual user.

Some users are registered with their mail addresses as the transmission destinations, and other users are registered as the transmission destinations with their FAX numbers, or with both the FAX numbers and the mail addresses.

If the address setting operation is completed, the multi-function peripheral 101 returns to the function selection state 502 (S6). Next, if the user chooses the electronic mail function, the multi-function peripheral 101 shifts to the e-mail state 505 (S7). Next, if the user completes the e-mail transmission operation, the multi-function peripheral 101 returns to the function selection state 502 (S8) If the user chooses the facsimile function, the multi-function peripheral 101 shifts to the facsimile state 506 (S9). If the FAX transmission is completed, the multi-function peripheral 101 returns to the function selection state (S10).

When the operating condition of the multi-function peripheral 101 is frequently set into the case in which the user specifies the destination address and transmits the scanning result by both the e-mail transmission and the FAX transmission, the frequency of occurrence of the state transitions "S3-S4-S5-S6-S7-S8-S9-S10" of FIG. 6 is high with respect to the state transition of the multi-function peripheral 101.

Figure 9:
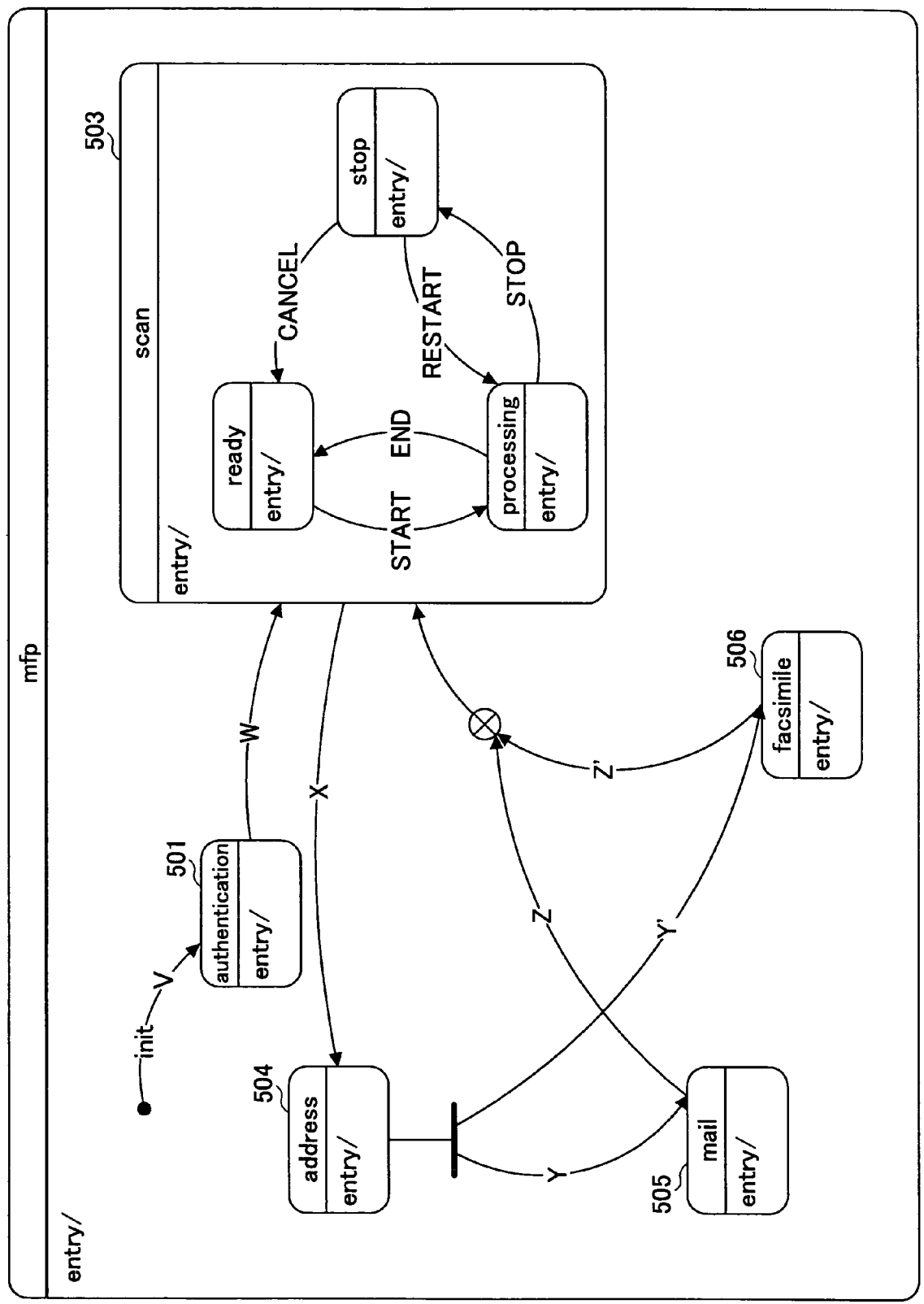
FIG. 9 is a state transition diagram for explaining a state transition of the multi-function peripheral of FIG. 1.

In this case, in the collector 401, the application detecting unit 413 uses the information acquired by the information acquisition unit 412, and detects existence of a JSDK application 147 which realizes the state transitions like "SV-SW-SX-SY-SZ-SY'-SZ'" shown in FIG. 9 as being a recommended JSDK application 147 for use in the multi-function peripheral 101.

Moreover, a case in which the user transmits a scanning result by e-mail and performs printing of the same is considered. In the function selection state 502, after the state transitions of S1-S8 of FIG. 6 are performed, the user chooses the print function by making the scanning result into a printing object. According to the user's selection, the multi-function peripheral 101 shifts to the print state 507 (S11). If the user completes the printing of the scanning result, the multi-function peripheral 101 shifts to the function selection state (S12).

When the operating condition of the multi-function peripheral 101 is frequently set into the case in which the user transmits the scanning result by e-mail and performs the printing of the scanning result, the frequency of occurrence of the state transitions "S3-S4-S5-S6-S7-S8-S11-S12" of FIG. 6 is high with respect to the state transition of the multi-function peripheral 101.

Figure 10:
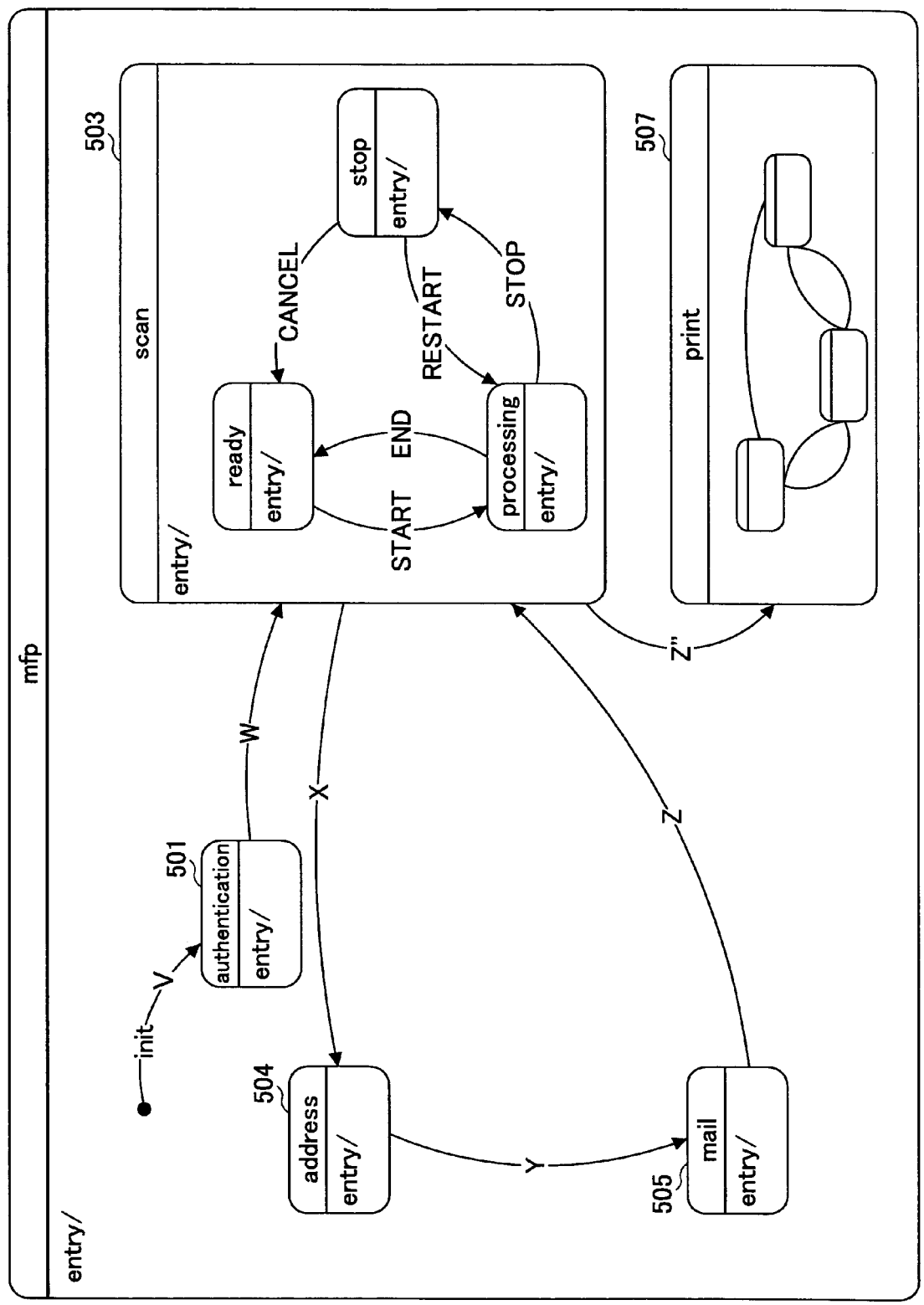
FIG. 10 is a state transition diagram for explaining a state transition of the multi-function peripheral of FIG. 1.

In this case, in the collector 401, the application detecting unit 413 uses the information acquired by the information acquisition unit 412, and detects existence of a JSDK application 147 which realizes the state transitions like "SV-SW-SX-SY-SZ-SZ'" shown in FIG. 10, as being a recommended JSDK application 147 for use in the multi-function peripheral 101.

Moreover, a case in which the user transmits a scanning result by e-mail and performs printing of a destination address for checking of the destination address is considered. In the function selection state 502, after the state transitions of S1-S8 of FIG. 6 mentioned above are performed, the user chooses the print function by making the address (transmission history) of the transmission destination of the scanning result into a printing object. According to the user's selection, the multi-function peripheral 101 shifts to the print state 507 (S11). If the user completes the printing of the transmission destination address, the multi-function peripheral 101 returns to the function selection state (S12).

Thus, when the operating condition of the multi-function peripheral 101 is frequently set into the case in which the user transmits the scanning result by e-mail and prints the transmission destination address of the scanning result, the frequency of occurrence of the state transitions "S3-S4-S5-S6-S7-S8-S11-S12" of FIG. 6 is high with respect to the state transition of the multi-function peripheral 101.

Figure 11:
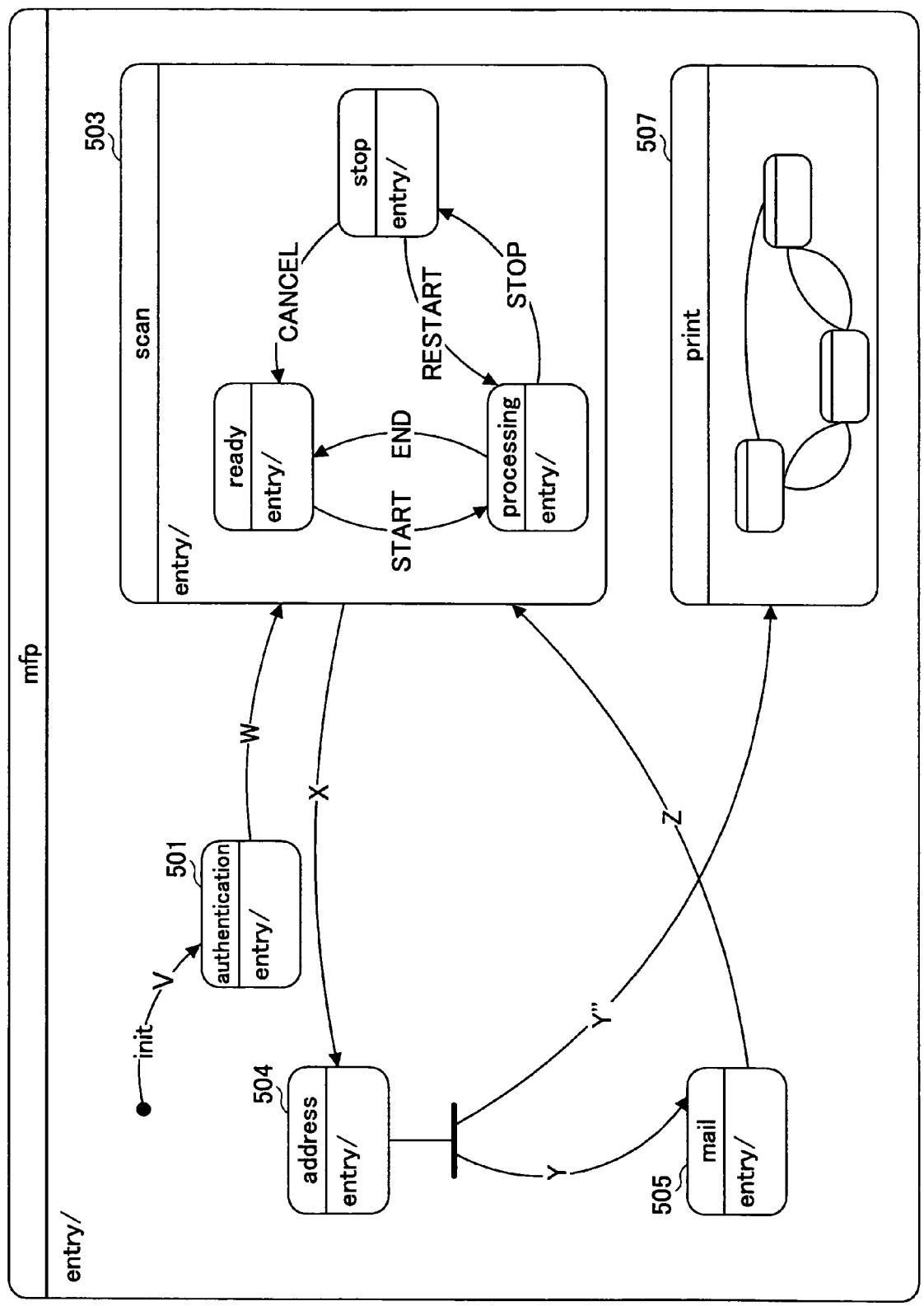
FIG. 11 is a state transition diagram for explaining a state transition of the multi-function peripheral of FIG. 1.

In this case, in the collector 401, the application detecting unit 413 uses the information acquired by the information acquisition unit 412, and detect existence of a JSDK application 147 which realizes the state transitions like "SV-SW-SX-SY-SZ-SY'" shown in FIG. 11, as being a recommended JSDK application 147 for use in the multi-function peripheral 101.

Figure 12:
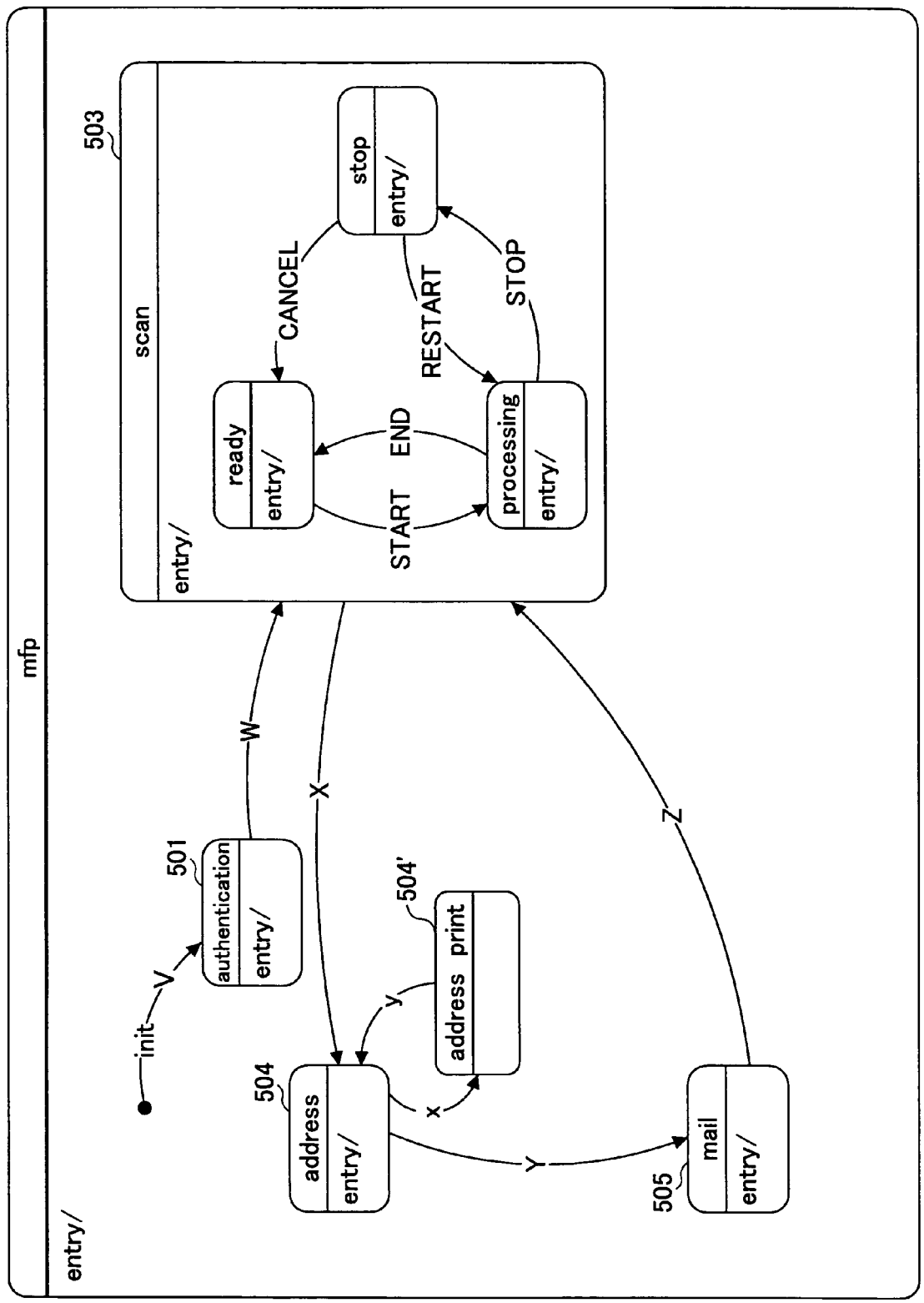
FIG. 12 is a state transition diagram for explaining a state transition of the multi-function peripheral of FIG. 1.

When the address functional module which realizes the address state 504 is updated to the enhanced version which has the print function of printing a transmission destination address, the application detecting unit 413 of the collector 401 detects existence of a JSDK application 147 which realizes the state transitions like "SV-SW-SX-SY-SZ-Sx-Sy" shown in FIG. 12, as being a recommended JSDK application 147 for use in the multi-function peripheral 101.

In FIG. 12, the state transition Sx (x: lower-case character) denotes a transition from the address state 504 within the address function module to the address print state (address print) 504', and the state transition Sy (y: lower-case character) denotes a transition or return from the address print state within the address function module.

Next, the details of the collection method of log information and the acquisition method of history information will be explained.

Suppose that the log information is collected with the function levels of the multi-function peripheral 101. The log information indicates any of the use of the electronic mail function, the use of the address function, the use of the print function, the use of the facsimile function, the use of the copy function, and the use of the scanning function.

The application programs 131 implemented in the multi-function peripheral 101 are created based on the classes (functional modules) of the functional levels of the multi-function peripheral 101. There are various classes including a class (scanning function module) related to the scan state 503, a class (address functional module) related to the address state 504, a class (electronic mail function module) related to the e-mail state 505, etc.

This makes it easier to acquire the history information related to the state transitions of the multi-function peripheral 101 on the basis of the functional level (functional module unit) of the multi-function peripheral 101. Moreover, this makes it easier to detect which JSDK application 147 has the ability to perform a specific state transition, and detect what kind of state transition a specific JSDK application 147 has, on the basis of the functional level (functional module unit) of the multi-function peripheral 101.

The details of the detecting method of JSDK application 147 will be explained. The JSDK applications 147 to be detected may be either the installed ones which are contained the HDD 233 or the memory card 235 of the multi-function peripheral 101, or the non-installed ones which exist in the media inserted in the multi-function peripheral 101 or in the network to which the multi-function peripheral 101 is connected.

The collector 401 collects periodically and automatically the information related to the JSDK applications 147 from the HDD 233, the memory card 235, the media, or the network.

And the collector 401 accumulates into a database the collected application information related to the JSDK applications 147 being detected, and manages the database.

The information related to the state transition of each JSDK application 147 is also registered into the application information. Therefore, the application detecting unit 413 detects a recommended JSDK application 147 for use in the MFP, as a result of comparing the information related to the state transition of the multi-function peripheral 101 collected by the information collecting unit 411, with the information related to the state transition of each JSDK application 147 in the database.

The details of the notifying method of JSDK application 147 will be explained. Existence of the detected JSDK application 147 is notified to a user by displaying it on the banner area of the operation display screen currently displayed on the touch panel 311 of the multi-function peripheral 101.

When the detected JSDK application 147 is the non-installed one, existence of the detected JSDK application 147 may be notified to the user regardless of whether the notification is performed before or after it is installed. Installation of the JSDK application 147 which is notified before it is installed will be carried out by the user's depression operation of the banner area as a trigger.

The collector 401 of the multi-function peripheral 101 of FIG. 1 uses the information related to the state transition of the multi-function peripheral 101 (which information corresponds to the information related the operating condition of the multi-function peripheral 101), detects a recommended JSDK application 147 for use in the multi-function peripheral 101, and notifies a user of existence of the recommended JSDK application 147.

The use mode as to how the multi-function peripheral 101 has been used will be reflected in the results of the detection of the JSDK application 147. Thus, the collector 401 of the multi-function peripheral 101 of FIG. 1 can provide the user with useful JSDK application 147.

The collector 401 uses the information related to the operating condition of the multi-function peripheral 101 or the information related to the state transition thereof, on a user basis (or for every individual user), and detects existence of a recommended JSDK application 147 for use in the multi-function peripheral 101 on a user basis, and notifies the user of the detection result. Since the individuality for every user is reflected in the use mode as to how the multi-function peripheral 101 has been used, and therefore it is more convenient to reflect the characteristics of every user in the recommendation of JSDK application 147 for use in the MFP.

Each user is managed by using a user ID. For example, JSDK application 147 "A" is recommended to the user "Mr. Suzuki" who has the user ID "001", JSDK application 147 "B" is recommended to the user "Mr. Sato" who has the user ID "002", and JSDK application 147 "C" is recommended to the user "Mr. Okubo" who has the user ID "003". If the multi-function peripheral 101 is provided so that the login processing is not carried out by the users, it is sufficient that existence of a recommended JSDK application 147 for use in the multi-function peripheral 101 is detected on a device basis, not on a user basis.

The application generation unit 414 in the collector 401 may be configured to generate a recommended JSDK application 147 for use in the multi-function peripheral 101, by using the information acquired by the information collecting unit 411 and the information acquisition unit 412, instead of detecting of the recommended JSDK application 147 by the application detecting unit 413. According to this configuration, it is unnecessary to prepare the recommended JSDK application 147, and, even when the recommended JSDK application 147 does not exist in the MFP, it is possible to take the corrective measure in such a case.

The details of the generating method of JSDK application 147 will be explained. The collector 401 generates a JSDK application 147 from the state transition diagram as shown in FIG. 8. The state transition diagram of FIG. 8 can be generated from the log information or the history information. The programming language of the JSDK application 147 being generated is the Java (registered trademark). It may be configured to generate the software of XML based on XMI like an UML drawing tool.

Figure 13:
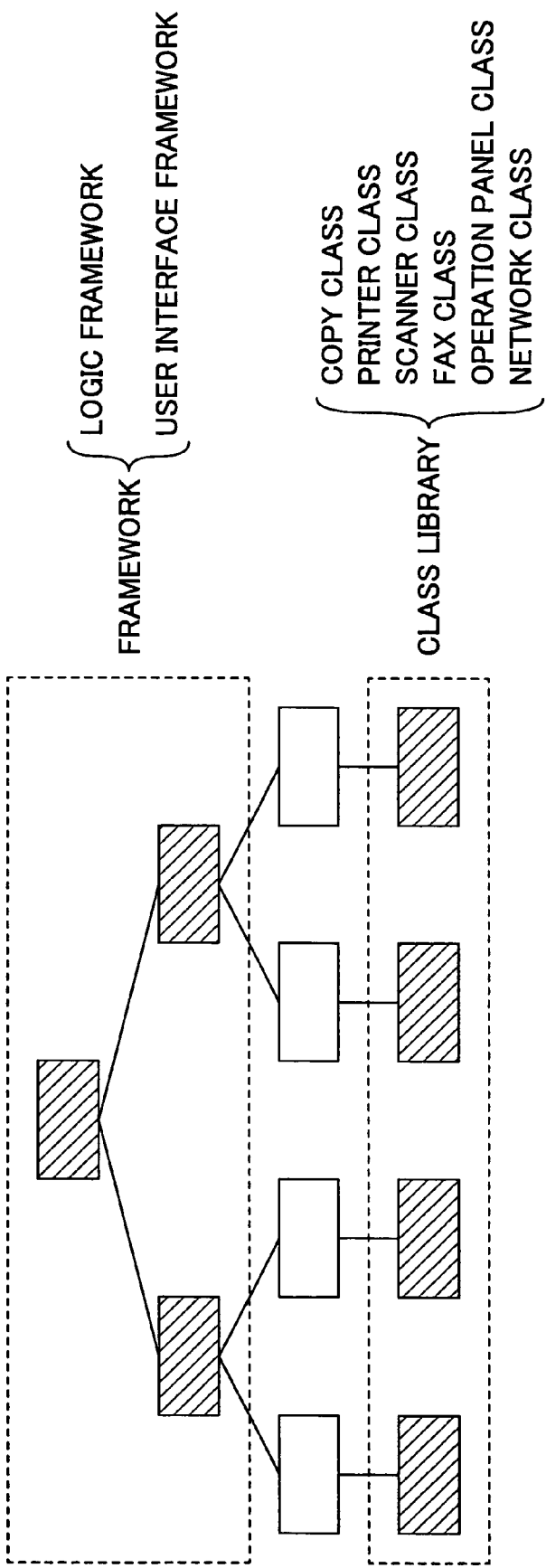
FIG. 13 is a diagram for explaining a framework and a class library.

Moreover, the multi-function peripheral 101 of FIG. 1 is provided with the framework and the class library for facilitating generation of JSDK application 147 as shown in FIG. 13. The framework is a half-completion software element used as the base of JSDK application 147, and it provides the upper layer of JSDK application 147. The class library is a library of the classes used as the parts of JSDK application 147, and it provides the lower layer of JSDK application 147.

As shown in FIG. 13, the framework comprises a logic framework and a user-interface framework. The logic framework is a logic-related framework of JSDK application 147, and it specifies a state transition of the multi-function peripheral 101. The user-interface framework is a user-interface-related framework of JSDK application 147, and it specifies a display-screen transition of the multi-function peripheral 101.

As shown in FIG. 13, the class library comprises a copy class which is a copy-related class, a printer class which is a printer-related class, a scanner class which is a scanner-related class, a facsimile class which is a facsimile-related class, an operation panel class which is an operation-panel-related class, and a network class which is a network-related class.

It may be configured so that a user or a super-user is allowed to correct the generated JSDK application 147. Concerning the generating method of JSDK application 147, Japanese Patent Application No. 2004-062413 discloses a similar generating method of JSDK application.

Information related to a state transition of JSDK application 147 generated by the application generation unit 414, is included in the application information to form the database, and it is registered into the database.

Figure 14:
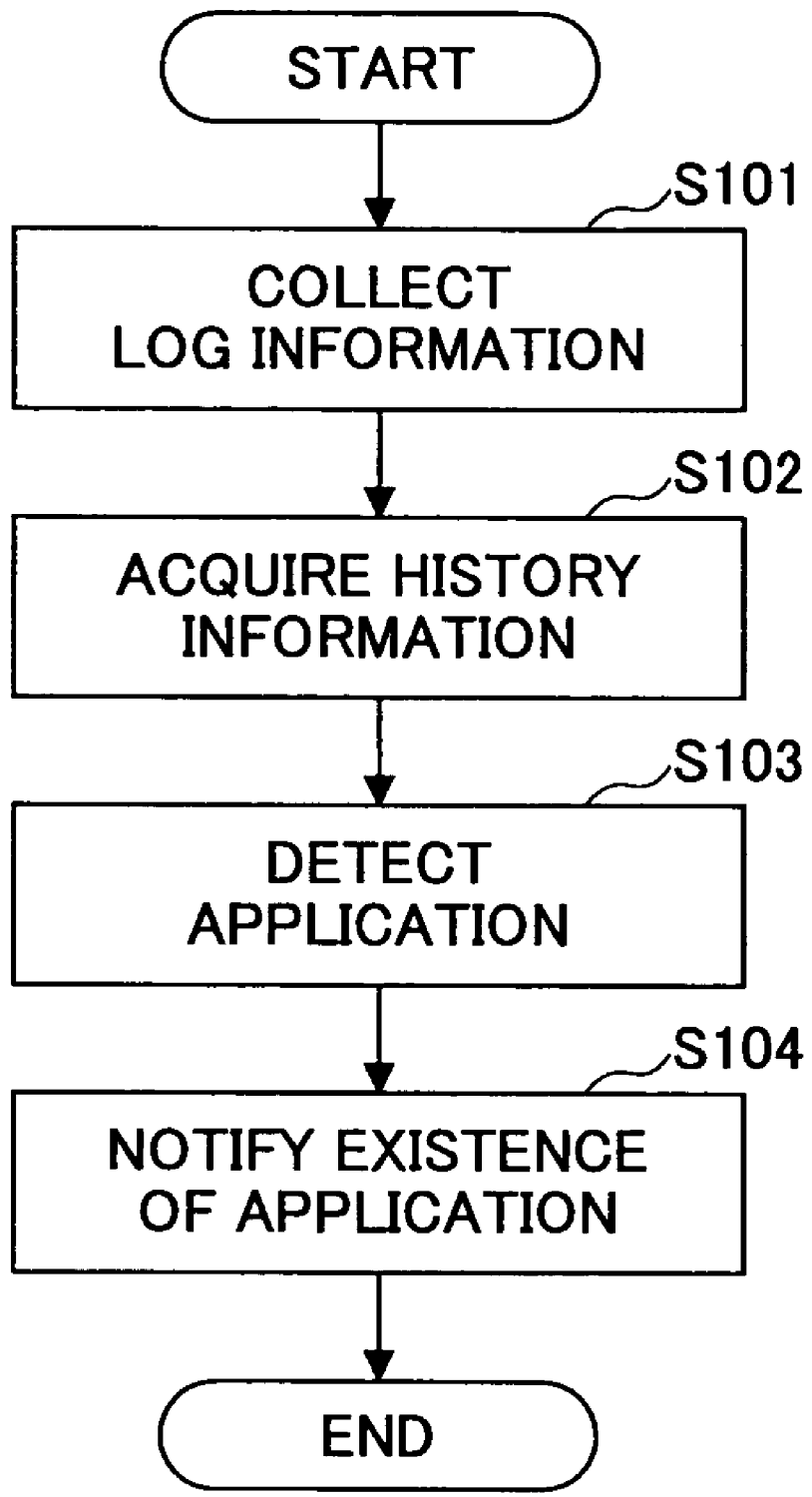
FIG. 14 is a flowchart for explaining a detection processing of JSDK application.

FIG. 14 is a flowchart for explaining the detection processing of JSDK application 147, which is performed by the collector 401.

As shown in FIG. 14, the collector 401 collects the log information related to the operating condition of the multi-function peripheral 101 (S101). The collector 401 acquires the history information related to the state transition of the multi-function peripheral 101 (S102).

The collecting processing of the log information and the acquiring processing of the history information may be performed each time a given time is reached, or each time the period of a predetermined time has passed, or each time a predetermined operation is carried out.

Next, the collector 401 detects a recommended JSDK application 147 for use in the multi-function peripheral 101 (S103). The collector 401 notifies a user of existence of the recommended JSDK application 147 for use in the multi-function peripheral 101 (S104). For example, the detection processing of JSDK application 147 is performed such that, when the frequency of occurrence of a specific state transition reaches a predetermined threshold, the JSDK application 147 which realizes the specific state transition is detected. For example, the notification processing of JSDK application 147 is performed immediately after the detection processing of JSDK application 147 is done. Since the touch panel 311 of the multi-function peripheral 101 is occupied by any of the application programs 131 in principle, the notification processing of JSDK application 147 is performed through such application program 131.

Figure 15:
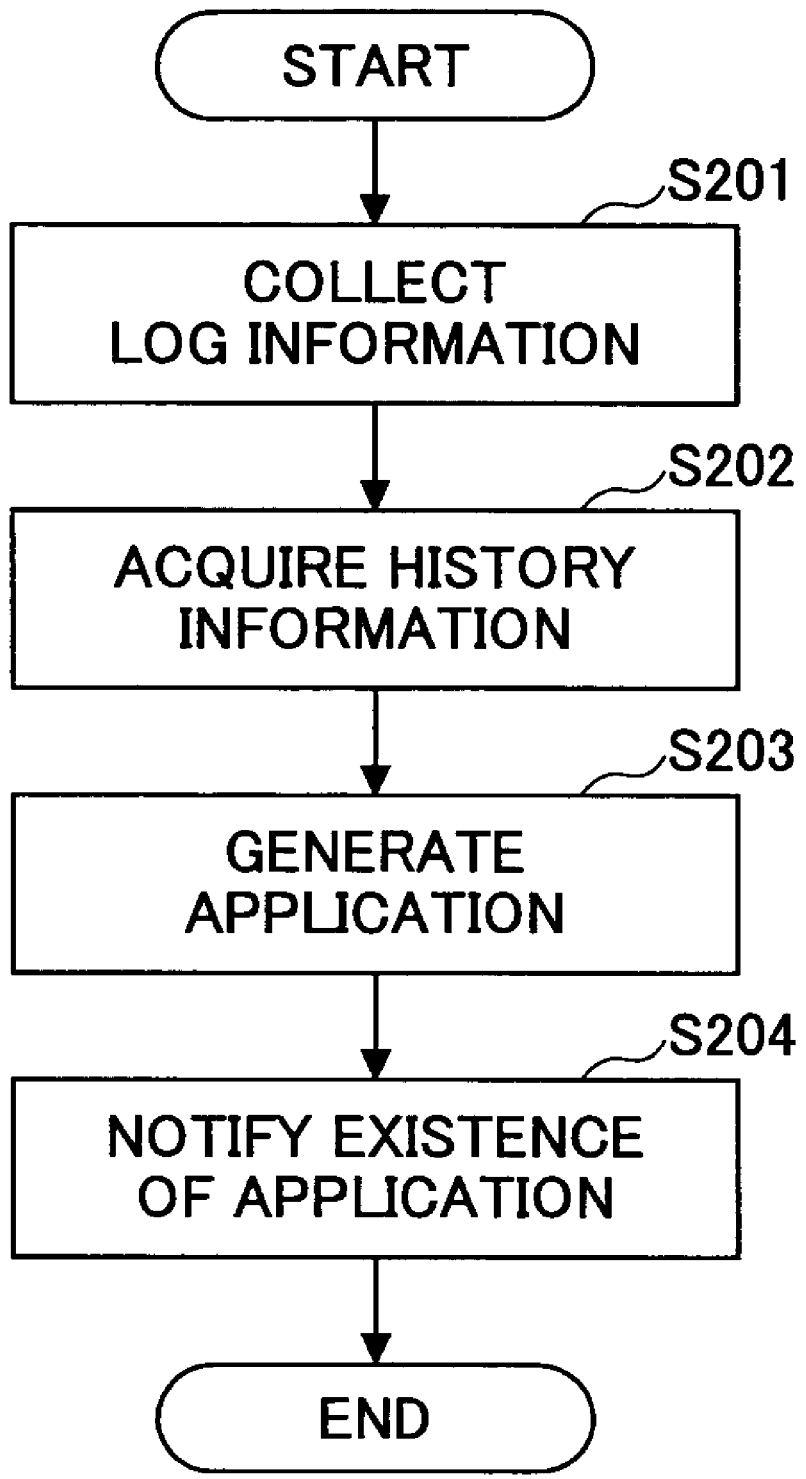
FIG. 15 is a flowchart for explaining a generation processing of JSDK application.

FIG. 15 is a flowchart for explaining the generation processing of JSDK application 147, which is performed by the collector 401.

As shown in FIG. 15, the collector 401 collects the log information related to the operating condition of the multi-function peripheral 101 (S201). The collector 401 acquires the history information related to the state transition of the multi-function peripheral 101 (S202).

The collecting processing of the log information and the acquiring processing of the history information may be performed each time a given time is reached, or each time the period of a predetermined time has passed, or each time a predetermined operation is carried out.

Next, the application generation unit 414 of the collector 401 generates a recommended JSDK application 147 for use in the multi-function peripheral 101 (S203). The application notification unit 415 notifies a user of existence of the recommended JSDK application 147 for use in the multi-function peripheral 101 (S204)

For example, the generation processing of JSDK application 147 at the step S203 is performed when the frequency of occurrence of a specific state transition reaches a predetermined threshold, so that a JSDK application 147 which realizes the specific state transition is generated. For example, the notification processing of the JSDK application 147 at the step S204 is performed immediately after the generation processing of the JSDK application 147 is performed.

Since the touch panel 311 of the multi-function peripheral 101 normally is occupied by any of the application programs 131, the notification processing of the JSDK application 147 is performed through the corresponding application program 131.

In the above-described embodiment, the example in which the application generation unit 414 generates automatically a JSDK application 147 which realizes the state transition, based on the history information related to the state transition of the multi-function peripheral 101 has been described. However, the generation processing of JSDK application 147 in the multi-function peripheral 101 is not limited to this embodiment. Alternatively, the generation processing of JSDK application 147 may be configured such that the user edits the state transition of the JSDK application 147 detected by the application detecting unit 413 is edited by the user interactively, and a new JSDK application 147 is generated.

For example, if the application detecting unit 413 detects existence of a recommended JSDK application 147 for use in the multi-function peripheral 101, by using the information related to the state transition of the multi-function peripheral 101, the application detecting unit 413 displays that information on the banner area of the operation screen, currently displayed on the touch panel 311 of the multi-function peripheral 101. A button for displaying the information related to the state transition of the detected JSDK application 147 is displayed on the banner area. If the user depresses the button on the banner area, then the application notification unit 415 displays on the touch panel 311 the screen in the information related to the state transition of the JSDK application 147 is displayed (which screen will be called the application state transition display screen).

Figure 16:
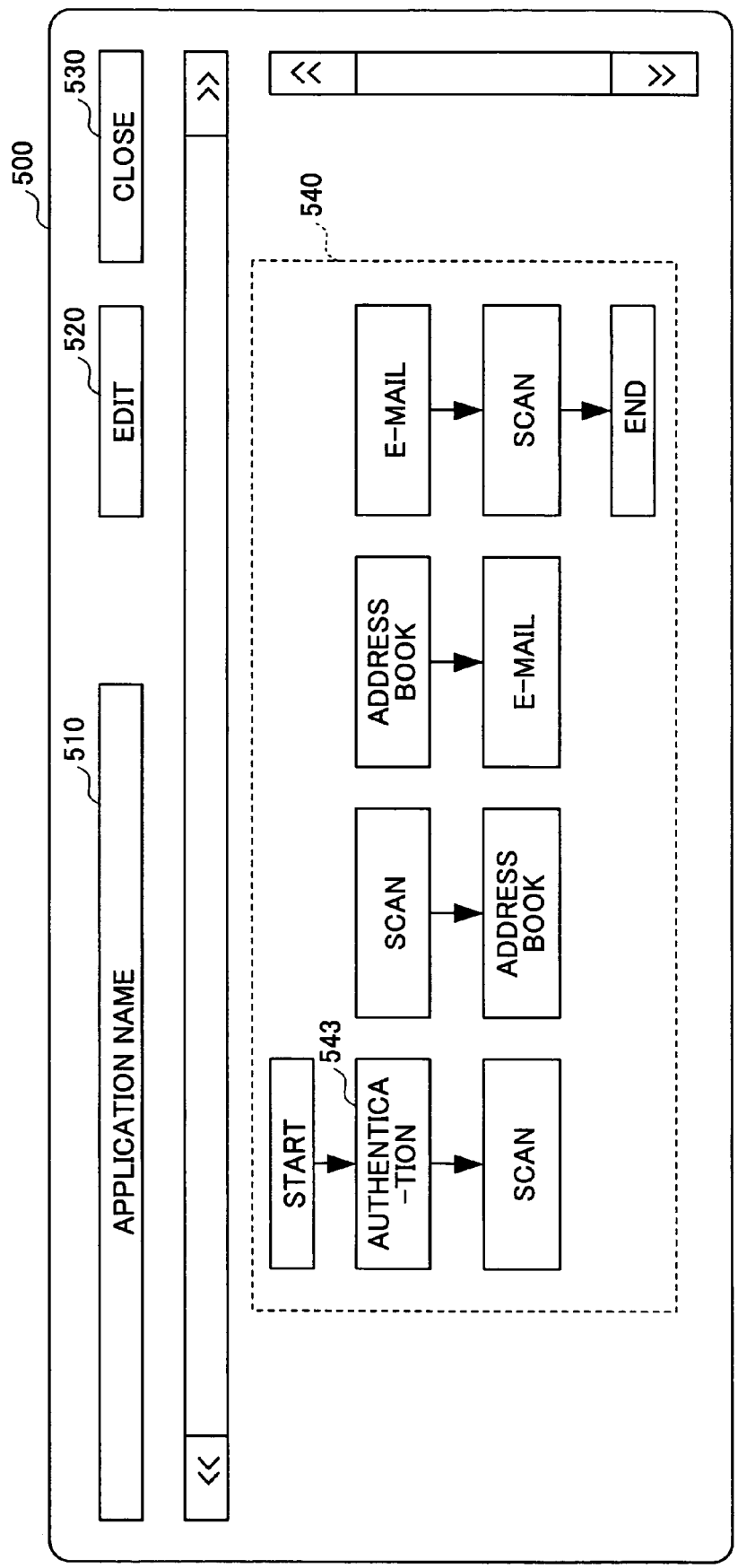
FIG. 16 is a diagram showing an example of an application state transition display screen.

FIG. 16 is a diagram showing an example of the application state transition display screen.

As shown in FIG. 16, the application state transition display screen 500 comprises an application-name indicating area 510, an edit button 520, a close button 530, and a state-transition indicating area 540.

The application-name indicating area 510 is an area where the application name of the JSDK application 147 (which will be called the current application) whose information related to the state transition is to be displayed.

The state-transition indicating area 540 is an area where the information related to the state transition of the current application is displayed. In the state-transition indicating area 540, the buttons (which will be called the state buttons) which correspond to respective states of the current application are arranged in order of the state transitions. In the state-transition indicating area 540 of FIG. 16, the state transitions concerning the state transition diagram shown in FIG. 8 are displayed.

That is, the current application shown in FIG. 16 is equivalent to the JSDK application 147 which realizes the state transitions shown in FIG. 8. The information related to the state transitions for being displayed on the state-transition indicating area 540 is included in the application information and accumulated in the database, and such information is used in the state-transition indicating area 540.

If the edit button 520 in the application state transition screen 500 is depressed, the application notification unit 415 sets the application state transition screen 500 in the edit mode. At this time, in order to avoid unjust editing performed by an authorized user, user authentication for checking a user code or an administrator code may be performed.

Figure 17:
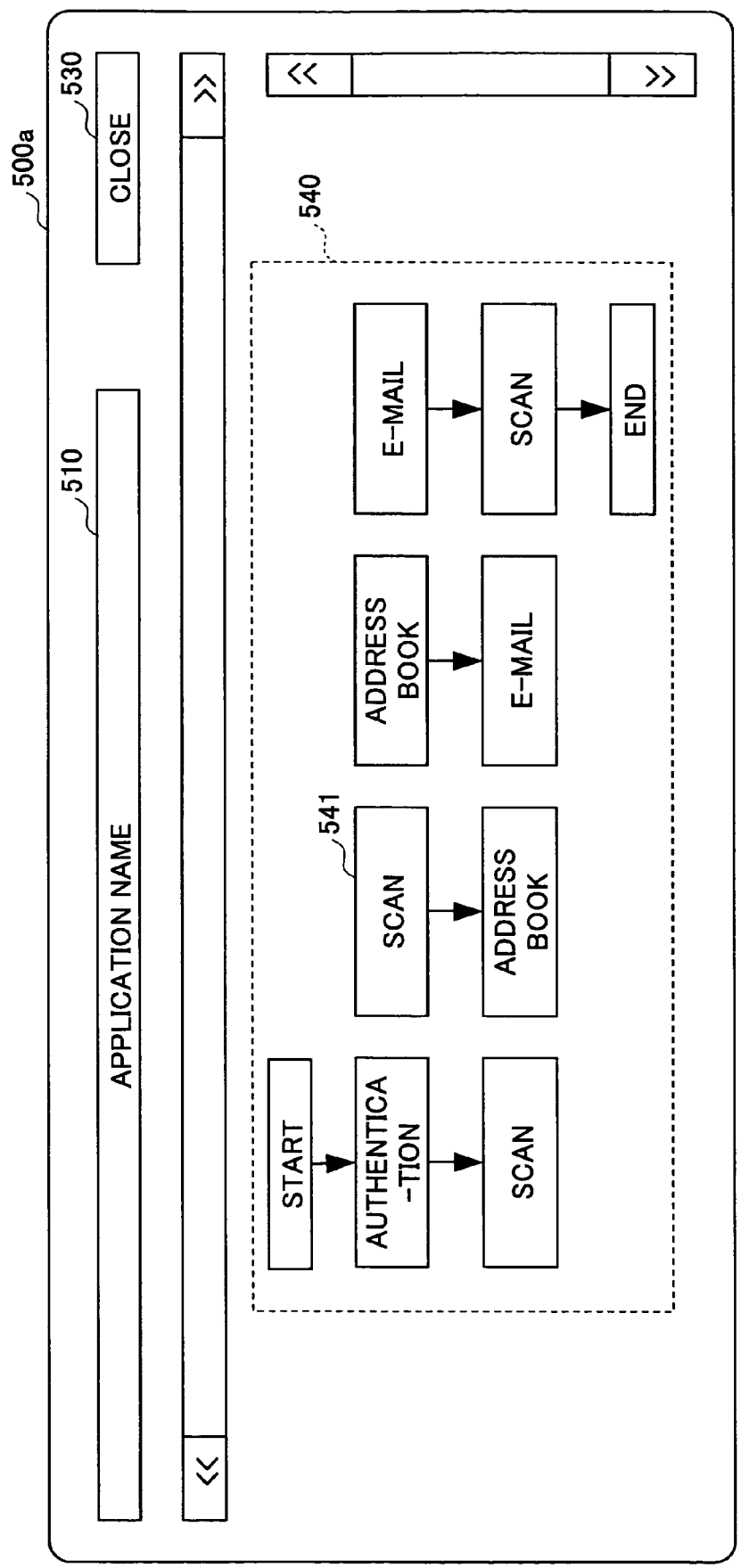
FIG. 17 is a diagram showing an example of the application state transition display screen in the edit mode.

FIG. 17 is a diagram showing an example of the application state transition display screen in the edit mode. In FIG. 17, the elements which are essentially the same as corresponding elements in FIG. 16 are designated by the same reference numerals, and a description thereof will be omitted.

Apparently, the application state transition display screen 500*a* in the edit mode differs from the display screen of FIG. 16, only in that the edit button 520 is not displayed. Moreover, operation in the edit mode which will be performed when the state button currently displayed on the state-transition indicating area 540 is depressed is also different from that in the case of the display screen of FIG. 16.

For example, if the scan button 541 corresponding to the scan state is depressed, the application generation unit 414 displays the screen (which will be called the state edit display screen) for allowing the user to perform editing of the state corresponding to the selected button, on the touch panel 311.

Figure 18:
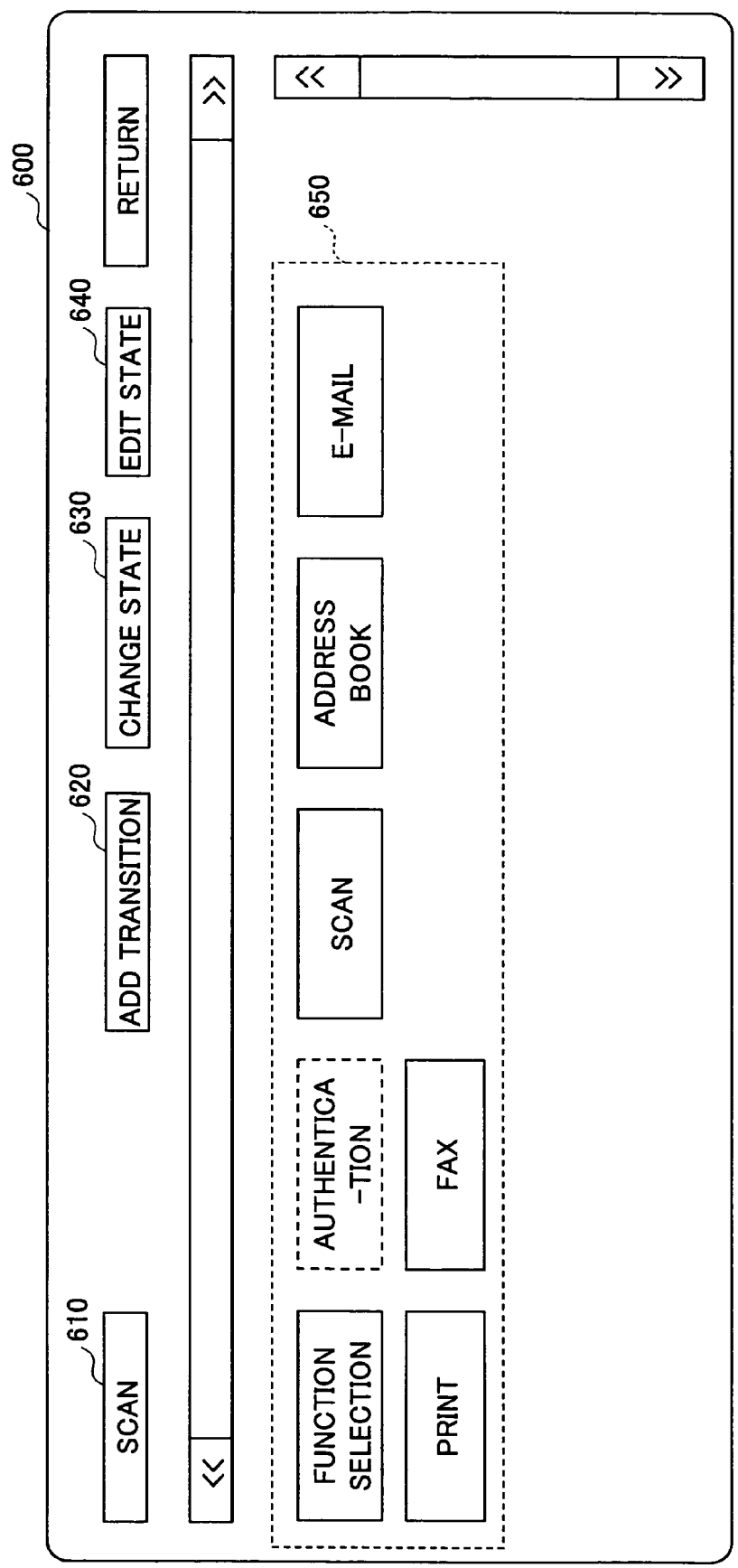
FIG. 18 is a diagram showing an example of a state edit display.

FIG. 18 is a diagram showing an example of the state edit display screen.

As shown in FIG. 18, the state edit display screen 600 comprises a current state name indicating area 610, a transition addition button 620, a state change button 630, a state edit button 640, and a state list display area 650.

The current state name indicating area 610 is an area where the state name of the state (current state) which is considered as the current editing object is displayed. The transition addition button 620 is a button for allowing the user to add a new transition from the current state.

The state change button 630 is a button for allowing the user to replace the current state with a different state, for being set to the transition position of the current state.

The state edit button 640 is a button for allowing the user to edit the internal state transition of the current state. The state list display area 650 is an area where a list of the states that can be realized in the multi-function peripheral 101 (i.e., a list of the functional modules installed in the multi-function peripheral 101) is displayed, and the buttons corresponding to the functional modules are arranged in the display area 650.

However, concerning the state which does not become a result of state transition from the current state, or the state which cannot be replaced for the current state, graying out of the corresponding button is performed and it is displayed (which is indicated by the dotted line in FIG. 18).

Determination as to whether the state concerned can become a result of state transition from the current state or not, or determination as to whether the state concerned can be replaced for the current state or not is carried out based on definition information, which indicates the relationship between the respective states, stored in the HDD 233 beforehand. For example, in this definition information, a list of the states which can become a result of the state transition from the current state is defined for every state. Therefore, the application generation unit 414 retrieves the definition information from the HDD 233 by using the current state as a key, and determines whether the state concerned can become a result of state transition from the current state, based on the result of the retrieval. Moreover, the application generation unit 414 retrieves the definition information from the HDD 233 by using the state concerned (which is, in this case, the authentication state) from which the current state changes, as a key, and determines whether the state concerned can be replaced for the current state, based on the result of the retrieval.

It is not necessary to limit the states displayed in the state list display area 650 to the states of the functional modules already installed in the multi-function peripheral 101. For example, the state of the functional module which is not installed but exists in the network connected to the multi-function peripheral 101 or in the recording medium inserted in the multi-function peripheral 101 may be used instead. In this case, the collector 401 collects periodically and automatically the information related to the functional module from the HDD 233, the memory card 235, the above-mentioned recording medium, or the above-mentioned network, and accumulates the collected information in the database in the HDD 233 so that the accumulated information is managed.

If the transition addition button 620 in the state edit display screen 600 is depressed and any of the buttons of the state list display area 650 is chosen, the application generation unit 414 displays on the touch panel 311 the display screen (which is called the transition condition setting display screen) which allows the user to set the conditions of transition from the current state to the state related to the chosen button.

Figure 19:
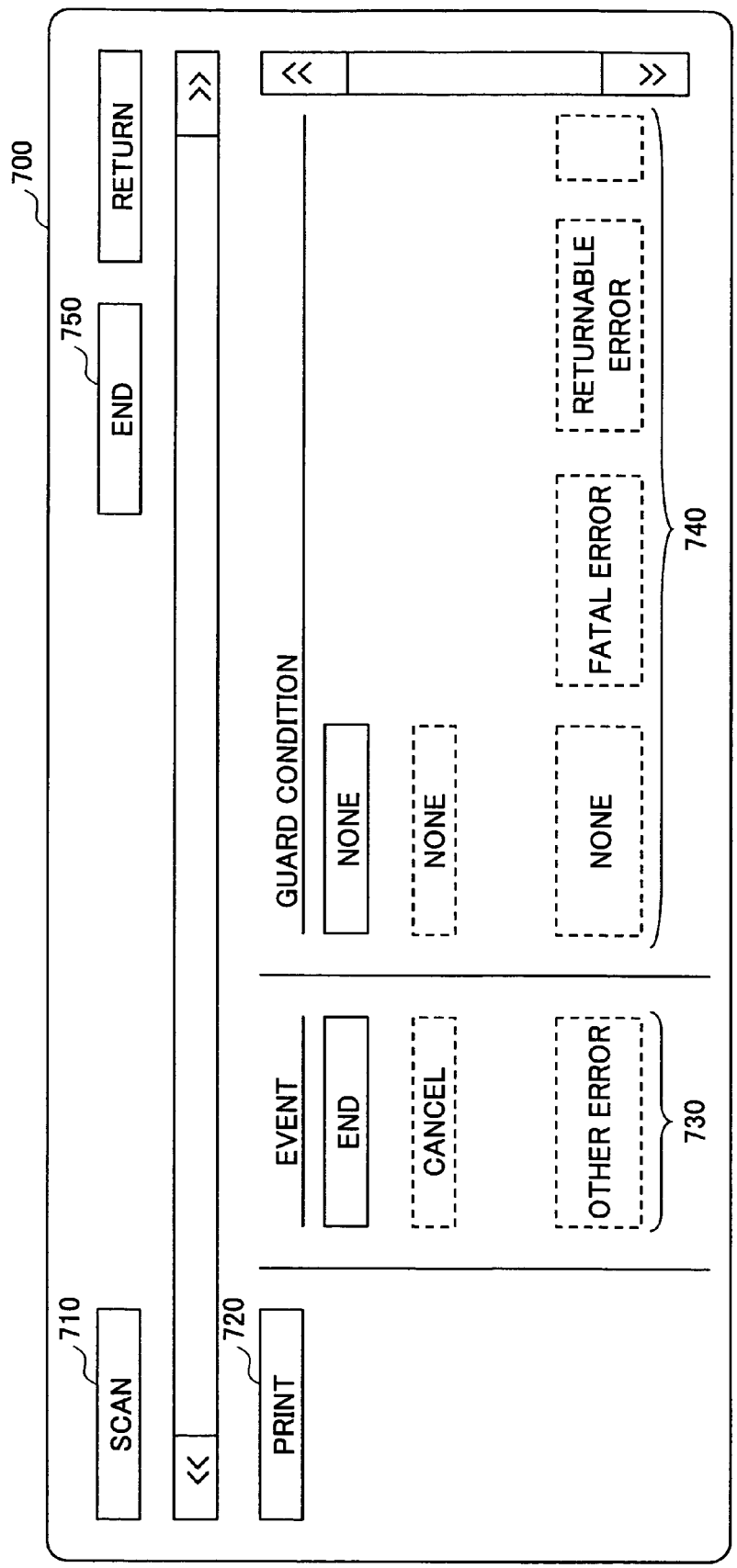
FIG. 19 is a diagram showing an example of a transition condition setting display screen.

FIG. 19 is a diagram showing an example of the transition condition setting display screen.

As shown in FIG. 19, the transition condition setting display screen 700 comprises a source state name indicating area 710, a destination state name indicating area 720, a transition event setting area 730, a guard condition setting area 740, and an end button 750.

The source state name indicating area 710 is an area where the name of the source state of the transition which is the editing object in the transition condition setting display screen 700 is displayed. And the destination state name indicating area 720 is an area where the name of the destination state of the transition which is the editing object in the transition condition setting display screen 700 is displayed.

In the example of FIG. 19, the case in which the print state in the state list display area 650 of FIG. 18 is chosen as the destination state is assumed. The transition event setting area 730 is an area for allowing the user to set the event which causes the state transition from the source state to the destination state.

In the example of FIG. 19, the "end" is chosen. This indicates that it is set up such that a result of the state transition after the source state (i.e., the scan state) is completed is the destination state.

The guard condition setting area 740 is an area for allowing the user to set up the guard conditions which do not generate the state transition (i.e., the conditions inhibiting occurrence of the state transition). For example, if "fatal error" is chosen, it means that the state transition is not generated when a fatal error takes place.

In the example of FIG. 19, "none" is chosen. This indicates that it is set up that there are no guard conditions which inhibit occurrence of the transition from the scan state to the print state.

If the event and the guard conditions are set up and the end button 750 is depressed, the application generation unit 414 generates a new JSDK application 147 based on the information related to the state transition after the editing. And the application generation unit 414 displays the application state transition display screen 500*a* of the generated JSDK application 147.

Figure 20:
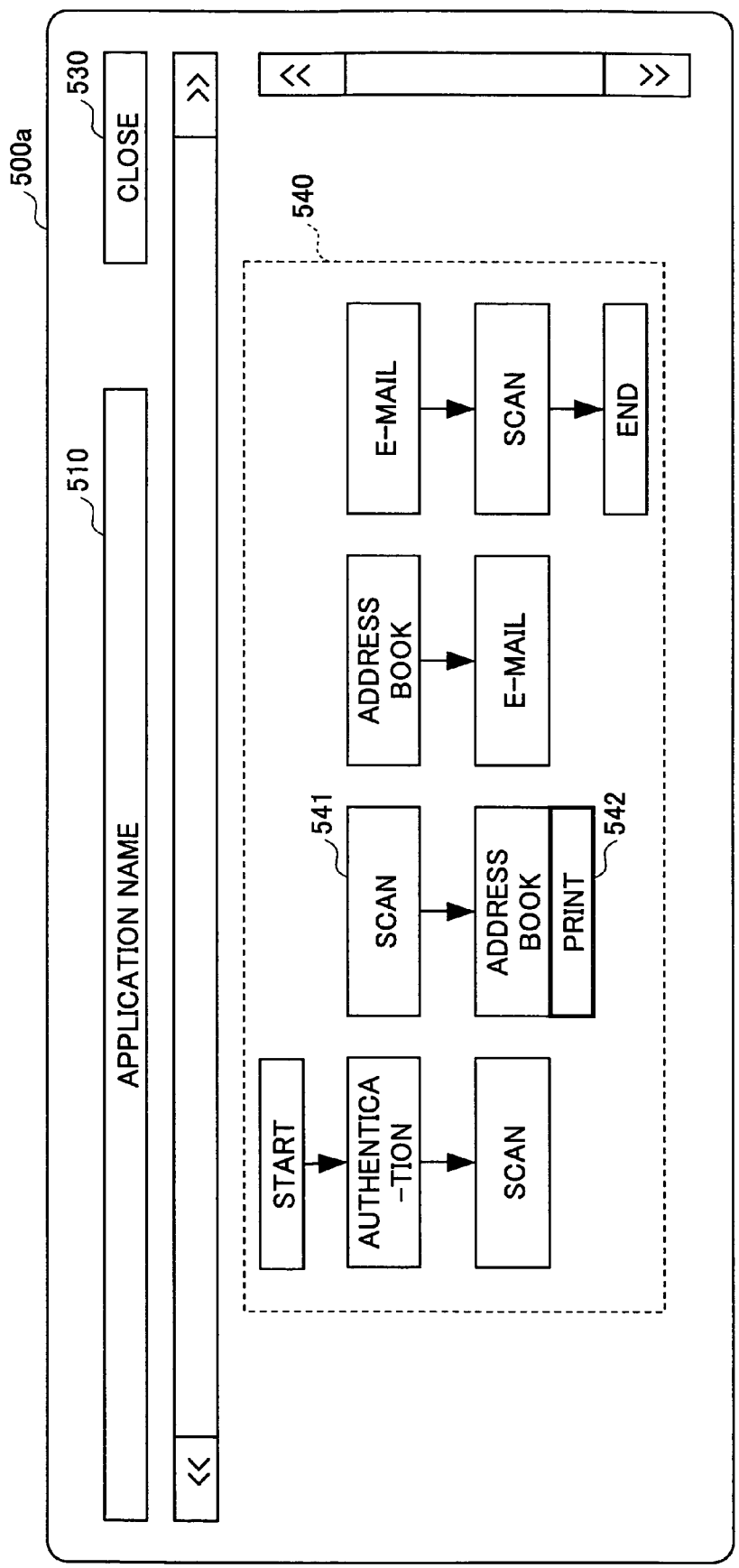
FIG. 20 is a diagram showing an example of the application state transition display screen where the edit result is reflected.

FIG. 20 is a diagram showing an example of the application state transition display screen where the edit result is reflected.

In FIG. 20, the elements which are the same as corresponding elements in FIG. 17 are designated by the same reference numerals, and a description thereof will be omitted.

In the application state transition display screen 500*a* of FIG. 20, a print button 542 is added to the position located under the scan button 541. That is, it is indicated that the print state is added as a result of the transition from the scan state. This means that the state transition which is equivalent to the state transition Z" shown in FIG. 10 is added.

On the other hand, if the state edit button 640 in the state edit display screen 600 of FIG. 18 is depressed, the application generation unit 414 displays the screen (which will be called the functional module state-transition display screen) for allowing the user to edit the state transition inside the functional module which performs the current state (the scan state in FIG. 18).

Figure 21:
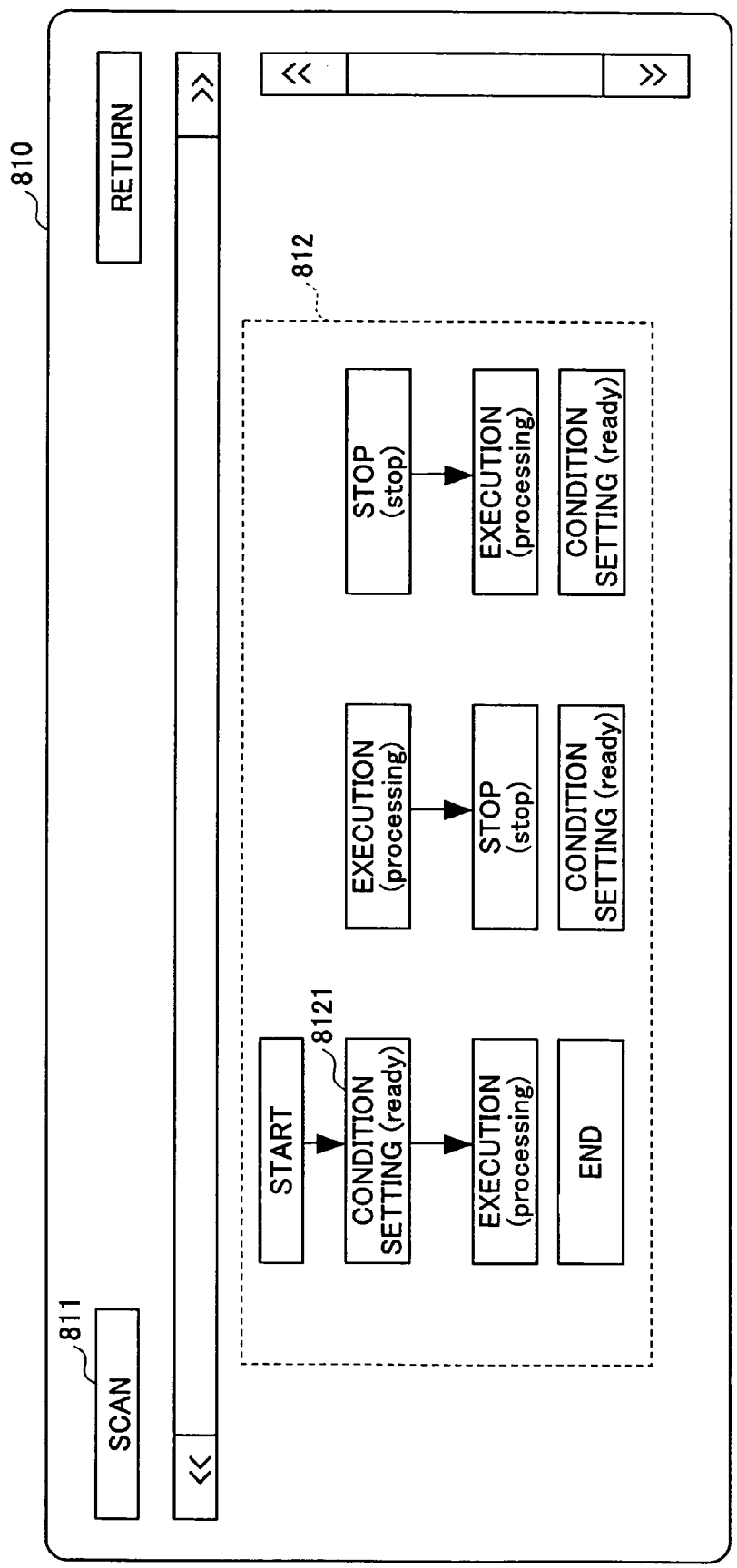
FIG. 21 is a diagram showing an example of a state transition display screen of a functional module.

FIG. 21 is a diagram showing an example of the functional module state-transition display screen of the functional module.

As shown in FIG. 21, the functional module state-transition display screen 810 comprises a functional module name indicating area 811 and a state-transition indicating area 812. The functional module name indicating area 811 is an area where the name of the functional module (the current functional module) which is the editing object, is displayed.

The state-transition indicating area 812 is an area where the information related to the state transition of the current functional module is displayed. In the state-transition indicating area 812, the buttons corresponding to the respective states are arranged in order of the state transition.

In the example of FIG. 21, the state transition related to the scan state 503 in the state transition diagram of FIG. 8 is displayed.

It is possible to edit the state transition of the functional module based on the functional module state-transition display screen 810 of FIG. 21, similar to the editing of the state transition of the JSDK application 147 mentioned above. For example, if the condition setting button 8121 in the state-transition indicating area 812 is depressed, the application generation unit 414 displays the state edit display screen by making the condition setting state (ready state) into the editing object.

Figure 22:
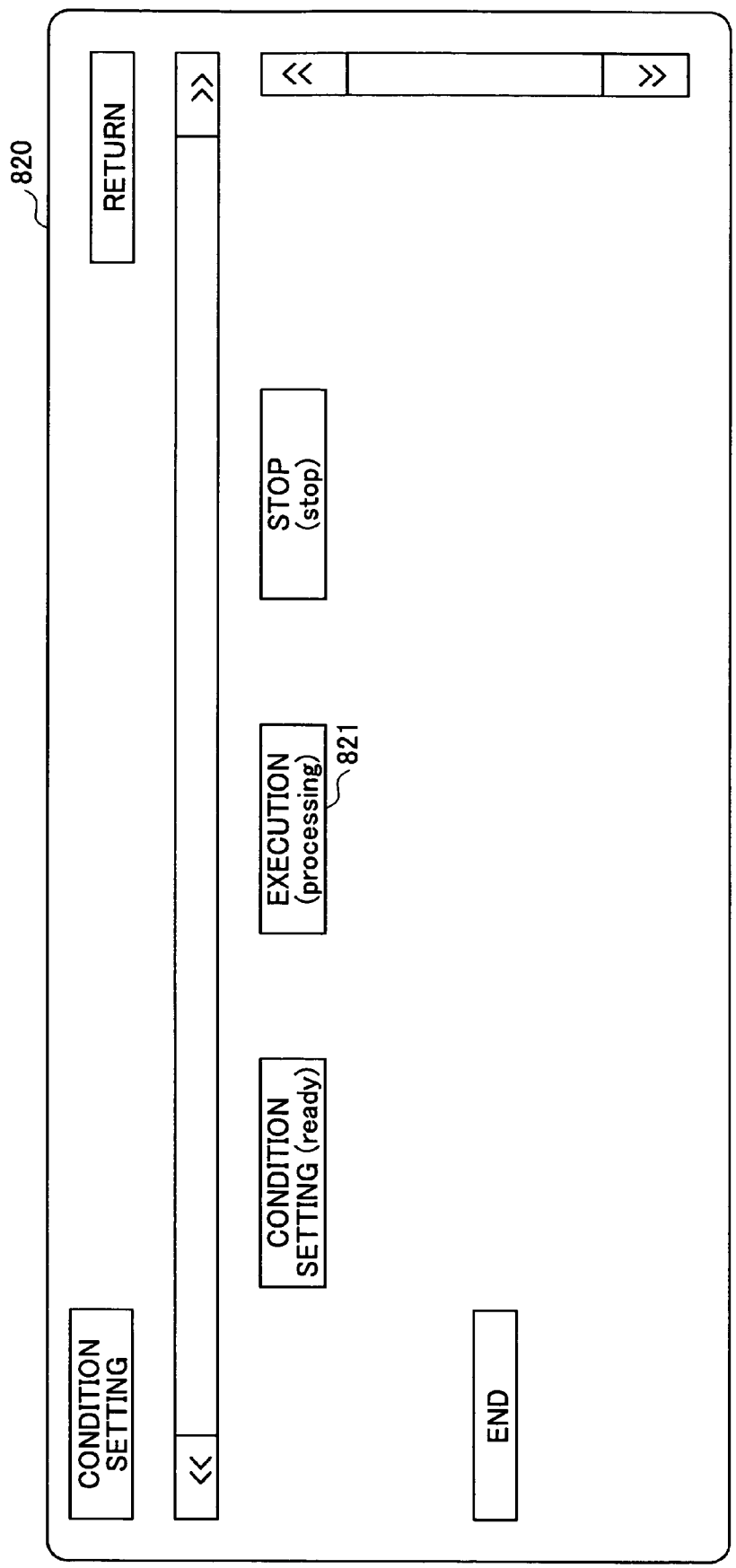
FIG. 22 is a diagram showing an example of the state edit display screen which is related to the state of a functional module.

FIG. 22 is a diagram showing an example of the state edit display screen which is related to the state of a functional module.

In the state edit display screen 820 of FIG. 22, a list of the buttons corresponding to respective states which constitute the current functional module is displayed.

For example, if the execution button 821 is chosen, the application generation unit 414 displays the transition condition setting display screen for allowing the user to set up the transition conditions which make the condition setting state into the source state and make the execution state into the destination state.

Figure 23:
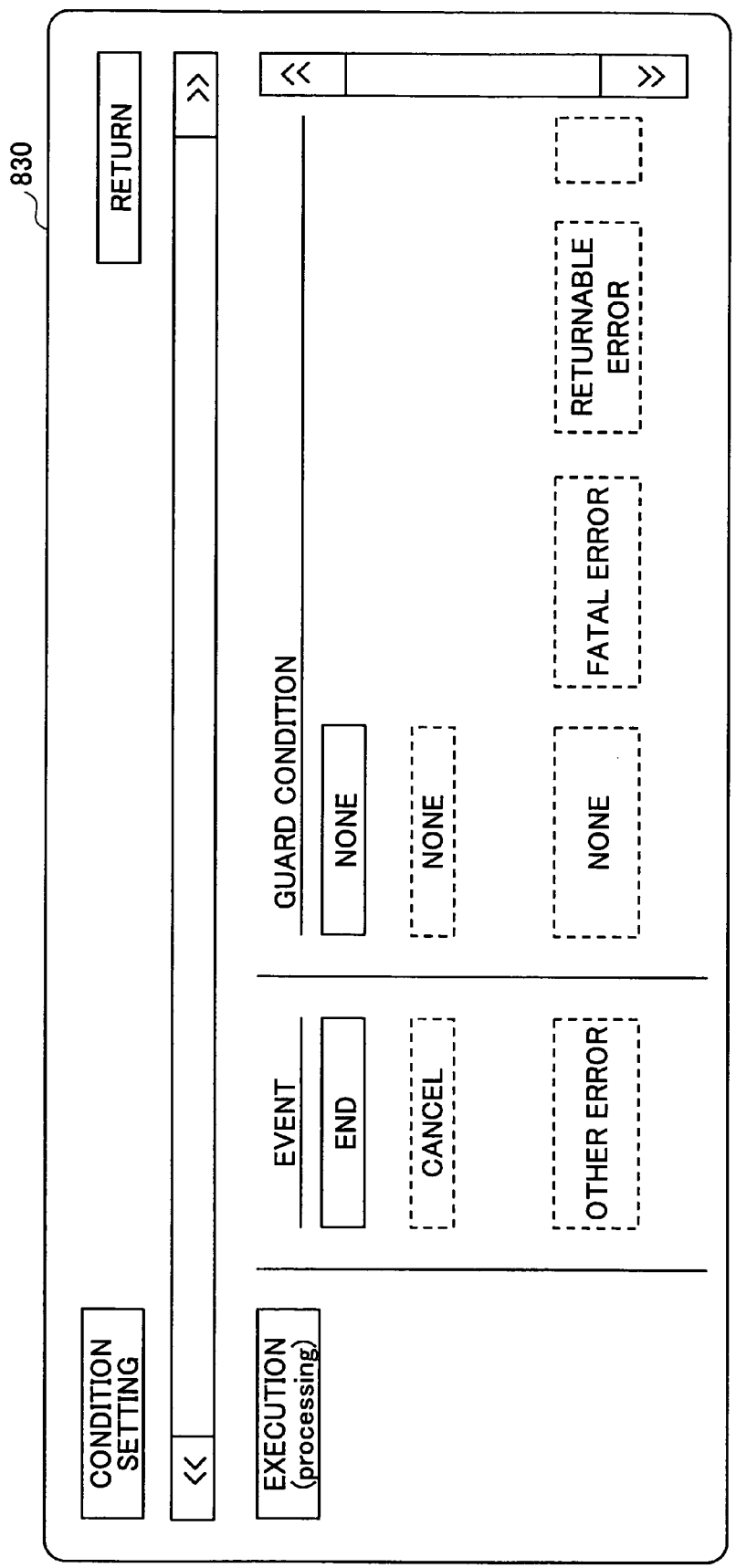
FIG. 23 is a diagram showing an example of a transition condition setting display screen which is related to the internal state transition of a functional module.

FIG. 23 is a diagram showing an example of the transition condition setting display screen related to the internal state transition of a functional module.

Since the operation method of the transition condition setting display screen 830 of FIG. 23 is essentially the same as that of the transition condition setting display screen 700 of FIG. 19, a description thereof will be omitted.

If the authentication button 543, in the state-transition indicating area 540 of the application state transition screen 500 of FIG. 16 which is not set in the edit mode, is depressed, the application generation unit 414 displays a detailed information setting display screen for allowing the user to set up a detailed information of the authentication state.

Figure 24:
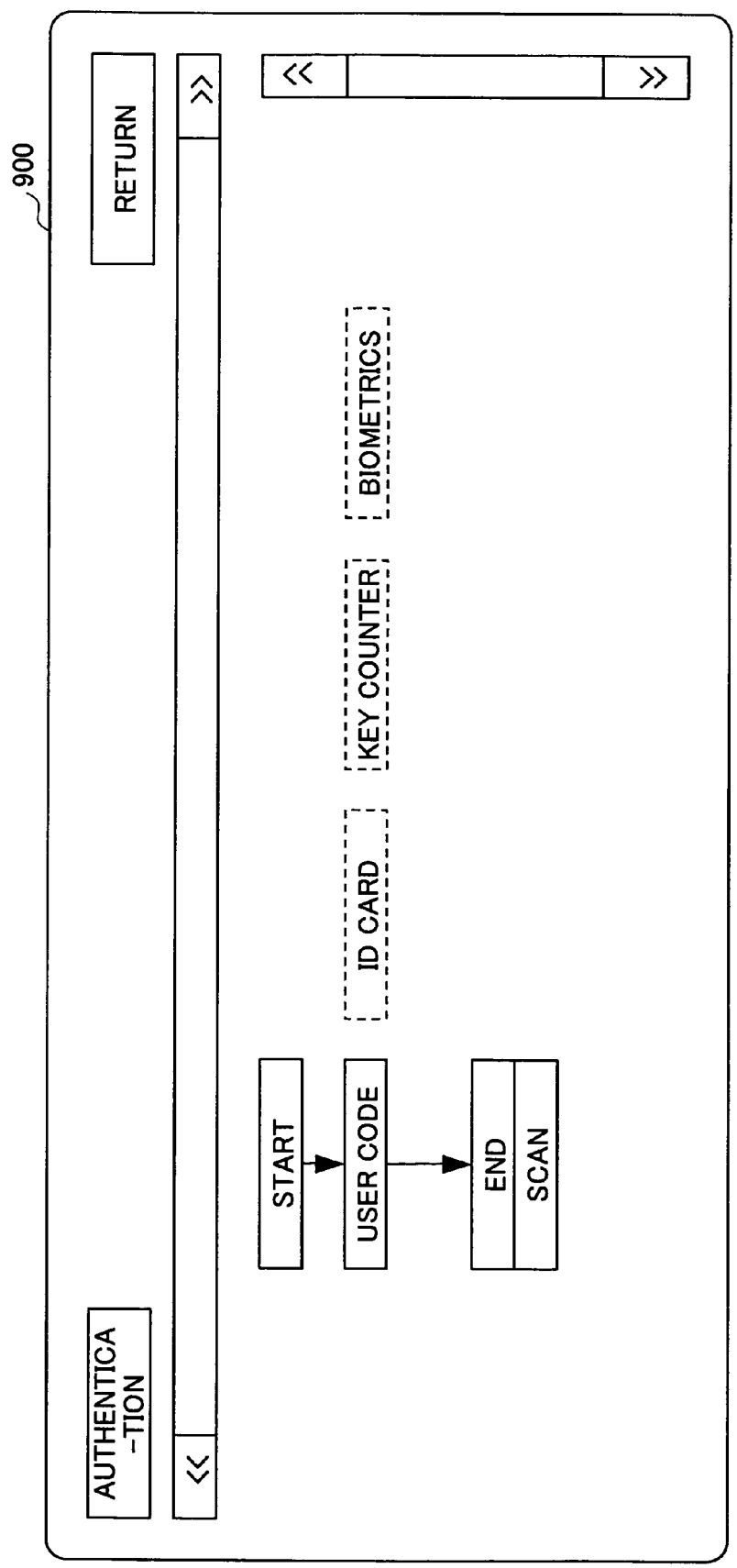
FIG. 24 is a diagram showing an example of a detailed information setting display screen.

FIG. 24 is a diagram showing an example of the detailed information setting display screen. A specific unit for performing the user authentication can be selected by the user in the detailed information setting screen 900 of FIG. 24.

As shown in FIG. 24, a user code, an ID card, a key counter, biometrics, etc. are displayed as alternatives. Graying out of the items of the ID card, the key counter and the biometrics is performed except the user code. This is because the functional modules for performing the user authentication, other than that using the user code, have not been found out.

The present invention is not limited to the above-described embodiments, and variations and modifications may be made without departing from the scope of the present invention.

Further, the present application is based on and claims the benefit of priority of Japanese patent application No. 2005-235422, filed on Aug. 15, 2005, and Japanese patent application No. 2006-210268, filed on Aug. 1, 2006, the entire contents of which are hereby incorporated by reference.

What is claimed is:

1. An information processing device having at least one processor that performs a plurality of application programs, comprising:
    an input unit which receives an input from a user to perform a plurality of operations;
    a displaying unit which causes a display device to display state transitions which simultaneously show a plurality of states to be realized for a respective one of the plurality of application programs;
    an information collecting unit that automatically collects log information indicating the user, an operation used by the user, a setting of the operation, and a date and time of the use of the operation at one of a predetermined time, after a predetermined period of time has assed and when a predetermined function is performed;
    an information acquisition unit that automatically acquires history information indicating how the states have changed based on the log information so as to produce the state transitions at one of the predetermined time, after the predetermined period of time has passed, and when the predetermined function is performed; and
    a generation unit which automatically receives an input updating request for updating the state transitions displayed on the display device, and automatically generates an application program for following the state transitions updated according to the updating request,
    wherein the generation unit both automatically receives the input updating request and automatically generates the application program when an occurrence of a number of times a specific state has changed as indicated by the history information exceeds a predetermined threshold.

2. The information processing device according to claim 1, further comprising:
    a detecting unit which automatically detects a recommended application program for use in the information processing device by using the log information collected by the information collecting unit,
    wherein the displaying unit is configured to automatically notify existence of the application program detected by the detecting unit as the recommended application program for use in the information processing device, and display the information related to the state transitions of the application program on the display device.

3. The information processing device according to claim 1, wherein the generation unit is configured to generate automatically a recommended application program for use in the information processing device by using the log information collected by the information collecting unit, and the displaying unit is configured to automatically notify existence of the application program generated by the generation unit as the recommended application program for use in the information processing device and display the information related to the state transitions of the application program on the display device.

4. The information processing device according to claim 2, wherein the detecting unit is configured to use the log information collected by the information collecting unit, on a user basis, and detect the recommended application program for use in the information processing device on the user basis.

5. The information processing device according to claim 3, wherein the generation unit is configured to use the log information collected by the information collecting unit, on a user basis, and generate the recommended application program for use in the information processing device on the user basis.

6. The information processing device according to claim 2, wherein the detecting unit is configured to use the history information acquired by the information acquisition unit and detect the recommended application program for use in the information processing device.

7. The information processing device according to claim 3, wherein the generation unit is configured to use the history information acquired by the information acquisition unit and generate the recommended application program for use in the information processing device.

8. The information processing device according to claim 6, wherein the detecting unit is configured to use the history information acquired by the information acquisition unit, on a user basis, and detect the recommended application program for use in the information processing device on the user basis.

9. The information processing device according to claim 7, wherein the generation unit is configured to use the history information acquired by the information acquisition unit, on a user basis, and generate the recommended application program for use in the information processing device on the user basis.

10. The information processing device according to claim 1, wherein the plurality of states correspond respectively to a plurality of different operations performed by the information processing device.

11. The information processing device according to claim 10, wherein the plurality of operations includes at least one of authenticating, scanning, electronic mailing, printing, faxing, and copying.

12. An information processing method implemented on an information processing device adapted for performing a plurality of application programs, the method comprising:
   receiving an input from a user to perform a plurality of operations;
   causing a display device to display state transitions which simultaneously show a plurality of states to be realized for a respective one of the plurality of application programs;
   collecting automatically log information indicating the user, an operation used by the user, a setting of the operation, and a date and time of the use of the operation at one of a predetermined time after a predetermined period of time has passed, and when a predetermined function is performed,
   acquiring automatically history information indicating how the states have changed based on the log information so as to produce the state transitions at one of the predetermined time, after the predetermined period of time has passed, and when the predetermined function is performed,
   receiving automatically an input updating request for updating the state transitions displayed on the display device; and
   generating automatically an application program for following the state transitions updated according to the updating request,
   wherein both the input updating request is automatically received and the application program is automatically generated when an occurrence of a number of times a specific state has changed as indicated by the history information exceeds a predetermined threshold.

13. The information processing method according to claim 12, further comprising:
   detecting automatically a recommended application program for use in the information processing device by using the collected log information,
   wherein the step of causing the display device includes notifying existence of the detected application program as the recommended application program for use in the information processing device, and automatically displaying the information related to the state transitions of the application program on the display device.

14. The information processing method according to claim 12, further comprising:
   generating automatically a recommended application program for use in the information processing device by using the collected log information,
   wherein the step of causing the display device includes notifying existence of the automatically generated application program as the recommended application program for use in the information processing device, and automatically displaying the information related to the state transitions of the application program on the display device.

15. The information processing method according to claim 13,
   wherein the step of detecting the recommended application program uses the acquired information.

16. The information processing method according to claim 14,
   wherein the step of generating automatically the recommended application program uses the acquired information.

17. A non-transitory computer-readable recording medium having program code stored thereon which, when executed by a computer, causes the computer to perform an information processing method for performing a plurality of application programs, the information processing method comprising:
   receiving an input from a user to perform a plurality of operations;
   causing a display device to display state transitions which simultaneously show a plurality of states to be realized for a respective one of the plurality of application programs;
   collecting automatically log information indicating the user, an operation used by the user, a setting of the operation, and a date and time of the use of the operation at one of a predetermined time, after a predetermined period of time has passed, and when a predetermined function is performed,
   acquiring automatically history information indicating how the states have changed based on the log information so as to produce the state transitions at one of the predetermined time, after the predetermined period of time has passed, and when the predetermined function is performed,
   receiving automatically an input updating request for updating the state transitions displayed on the display device; and
   generating automatically an application program for following the state transitions updated according to the updating request,
   wherein both the input updating request is automatically received and the application program is automatically generated when an occurrence of a number of times a specific state has changed as indicated by the history information exceeds a predetermined threshold.

* * * * *